United States Patent
Aoki

(10) Patent No.: US 8,264,790 B2
(45) Date of Patent: Sep. 11, 2012

(54) HOUSING APPARATUS FOR HOUSING HOUSED OBJECT, HOUSING METHOD THEREFOR, AND LIBRARY APPARATUS FOR HOUSING RECORDING MEDIUM

(75) Inventor: Kenji Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 4 days.

(21) Appl. No.: 12/822,629

(22) Filed: Jun. 24, 2010

(65) Prior Publication Data

US 2011/0013314 A1  Jan. 20, 2011

(30) Foreign Application Priority Data

Jul. 15, 2009 (JP) ................... 2009-167181

(51) Int. Cl.
*G11B 15/68* (2006.01)
(52) U.S. Cl. ........................ 360/92.1; 312/9.9
(58) Field of Classification Search ............. 360/92.1; 312/9.9, 9.31, 9.46
See application file for complete search history.

(56) References Cited

U.S. PATENT DOCUMENTS

| | | | | |
|---|---|---|---|---|
| 3,378,827 A * | 4/1968 | Hertrich | ................ | 360/92.1 |
| 3,578,143 A | 5/1971 | Woodward | | |
| 4,063,294 A * | 12/1977 | Burkhart | ................ | 360/92.1 |
| 5,236,258 A * | 8/1993 | Bunch | ................ | 312/9.31 |
| 5,285,333 A * | 2/1994 | Barr et al. | ................ | 360/92.1 |
| 5,415,471 A * | 5/1995 | Dalziel | ................ | 312/9.46 |
| 5,449,091 A * | 9/1995 | Dalziel | ................ | 221/81 |
| 5,505,586 A | 4/1996 | Lichti | | |
| 5,555,143 A * | 9/1996 | Hinnen et al. | ................ | 360/92.1 |
| 5,588,790 A | 12/1996 | Lichti | | |
| 5,595,263 A * | 1/1997 | Pignataro | ................ | 186/53 |
| 5,781,517 A | 7/1998 | Nakajima | | |
| 5,847,897 A * | 12/1998 | Marlowe | ................ | 360/92.1 |
| 5,856,894 A | 1/1999 | Marlowe | | |
| 6,804,080 B1 * | 10/2004 | Gavit et al. | ................ | 360/92.1 |
| 6,943,975 B2 * | 9/2005 | Steinhilber | ................ | 360/69 |
| 7,012,779 B2 * | 3/2006 | Taki et al. | ................ | 360/77.12 |
| 7,369,354 B2 | 5/2008 | Steinhilber | | |
| 2004/0114271 A1 | 6/2004 | Taki et al. | | |

FOREIGN PATENT DOCUMENTS

| | | |
|---|---|---|
| JP | 50-15566 A | 6/1975 |
| JP | 54-9835 Y1 | 5/1979 |
| JP | 62-202657 U | 12/1987 |

(Continued)

OTHER PUBLICATIONS

Japanese Office Action mailed Jun. 7, 2011 for corresponding Japanese Application No. 2009-167181, with Partial English-language Translation.

(Continued)

*Primary Examiner* — Angel A. Castro
(74) *Attorney, Agent, or Firm* — Fujitsu Patent Center

(57) ABSTRACT

A housing apparatus includes a plurality of housing units to have housed objects housed therein, a carrying unit to include the plurality of the housing units arranged in a ring shape, the carrying unit carrying the housing units to a carriage position, and a transferring unit to be disposed facing a carriage destination of the housed objects with the carrying unit existing therebetween to transfer the housed object in the housing unit carried and positioned at the carriage position from the housing unit to the carriage destination or to transfer the housed object in the carriage destination from the carriage destination to the housing unit.

15 Claims, 38 Drawing Sheets

FOREIGN PATENT DOCUMENTS

| | | |
|---|---|---|
| JP | 1-135438 A | 5/1989 |
| JP | 5-325354 A | 12/1993 |
| JP | 6-44596 U | 6/1994 |
| JP | 7-130072 A | 5/1995 |
| JP | 8-127402 | 5/1996 |
| JP | 9-506064 A | 6/1997 |
| JP | 2000-355410 A | 12/2000 |
| JP | 2002-321775 A | 11/2002 |
| JP | 2003-178500 A | 6/2003 |
| JP | 2003-196900 A | 7/2003 |
| WO | WO-95/12537 A1 | 5/1995 |

OTHER PUBLICATIONS

Japanese Office Action, mailed Oct. 11, 2011 for corresponding Japanese Application No. 2009-167181, with Partial English-language Translation.

Japanese Office Action mailed Jul. 3, 2012 for corresponding Japanese Application No. 2009167181, with Partial English-language Translation.

* cited by examiner

HOUSING APPARATUS FOR HOUSING HOUSED OBJECT, HOUSING METHOD THEREFOR, AND LIBRARY APPARATUS FOR HOUSING RECORDING MEDIUM

CROSS-REFERENCE TO RELATED APPLICATIONS

This application is based upon and claims the benefit of priority of the prior Japanese Patent Application No. 2009-167181, filed on Jul. 15, 2009, the entire contents of which are incorporated herein by reference.

FIELD

Embodiments discussed herein are related to housing and storage of a housed object such as a recording medium used for recording information such as a magnetic recording tape and a tape cartridge with a magnetic recording tape built-in, and to a housing apparatus, a housing method, and a library apparatus with housing units formed into a chain for housing a housed object such as a recording medium, for example.

BACKGROUND

Conventionally, for example, a library apparatus is used for a housing apparatus for housing a plurality of housed objects. The library apparatus is utilized as a backup location or an archive location for data, and houses in cells a plurality of cartridges, etc. with magnetic recording tapes built-in. Such a library apparatus has an internal arrangement configuration with cartridges horizontally placed, stacked in a plurality of steps in the height direction, and arranged in a plurality of rows in the depth direction of the library apparatus, or with cartridges longitudinally placed and arranged in a plurality of rows. When data is written on or read from a magnetic recording tape, a cartridge is taken out from a cell and carried and inserted into a specified drive device by using a robot. When a process in the drive device is terminated, the cartridge is ejected from the drive device and returned to the original cell by the robot.

When a housed object such as a cartridge is carried, the operation of the robot, i.e., a carrying unit is complicated depending on the increase in the number of objects housed in the library apparatus.

For such carriage of a housed object, it is known to carry the housed object with a rotating rack (Japanese Laid-Open Patent Publication No. 01-135438), to rotate and move a housing cell with a cartridge housed to a driving apparatus (Japanese Laid-Open Patent Publication No. 07-130072), to rotate a cartridge access station along with a cell drum for delivery to an accessor (Japanese Laid-Open Patent Publication No. 08-127402), etc.

Such taking out and carriage of cartridges arranged and housed in a plurality of steps and a plurality of rows necessitates a robot requiring multi-system operation, for example. This robot performs, for example, the movement in the height direction, the movement in the depth direction, a rotating operation, the movement in the backward and forward direction within handling of the robot, and the opening/closing operation of a claw unit of the handling.

The library apparatus uses a size of a drive device, i.e., a carriage destination, as a reference and the size in the height direction is determined based on the reference. The number of cartridges capable of being housed varies depending on the arrangement configuration within the apparatus. Therefore, as compared to a conventional carrying robot, it is more difficult to increase the cartridge housing efficiency in the arrangement configuration requiring the multi-system operation since an operation space of the robot is needed to be ensured and a waste space inaccessible to the robot may be generated depending on the cartridge arrangement configuration. Such a robot performing the multi-system operation requires complicated configuration and control since a motor, etc., are needed for a driving unit for each of operational systems.

Such requests and problems are not disclosed or suggested, and the solving configuration thereof, etc. is not disclosed or suggested in Japanese Laid-Open Patent Publication Nos. 01-135438, 07-130072, and 08-127402.

SUMMARY

Therefore, to solve the above problems, a housing apparatus of this disclosure includes a housing unit, a carrying unit, and a transferring unit. A plurality of the housing units are included to house the housed object. The plurality of the housing units are arranged in a ring shape in the carrying unit, and the carrying unit carries the housing units to a carriage position. The transferring unit is disposed facing a carriage destination of the housed object with the carrying unit existing therebetween to transfer the housed object in the housing unit carried and positioned at the carriage position from the housing unit to the carriage destination or to transfer the housed object in the carriage destination from the carriage destination to the housing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Other objects, features, and advantages of the present invention will become more apparent by reference to the accompanying drawings and embodiments.

DESCRIPTION OF EMBODIMENTS

First Embodiment

A first embodiment is an example of a housing apparatus and a housing method; a housed object is carried by a plurality of housing units arranged in a ring shape; and the housing unit is positioned at a carriage position. The housed object is then transferred from the housing unit to a carriage destination or the housed object is transferred from the carriage destination to the housing unit.

Figure 1:
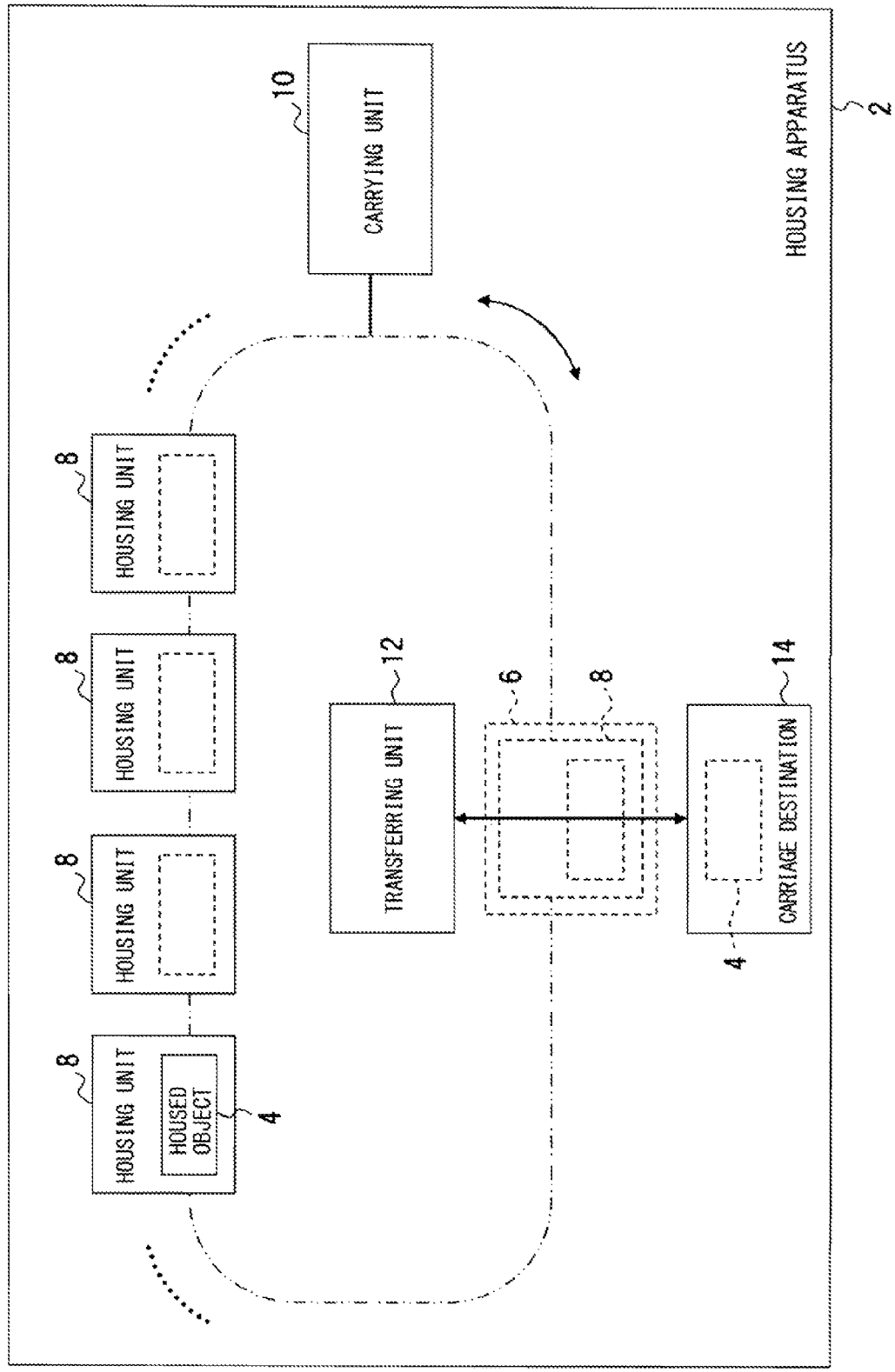
FIG. 1 is a diagram of an exemplary configuration of housing units according to a first embodiment.

The first embodiment will be described with reference to FIG. 1. FIG. 1 is a diagram of an exemplary configuration of the housing apparatus according to the first embodiment. The configuration depicted in FIG. 1 is by way of example and not limitation.

This housing apparatus 2 is an example of a housing apparatus or a housing method. The housing apparatus 2 includes a plurality of housing units 8 that house a housed object 4, for example, and these housing units 8 are utilized to carry the housed object 4 to the side of a predetermined carriage position 6. The housing unit 2 also includes a carrying unit 10, a transferring unit 12, and a carriage destination 14.

The housing unit 8 is an example of a unit that houses and stores the housed object 4. A plurality of the housing units 8 are coupled and arranged in a ring shape in the housing apparatus 2 and is rotated by the carrying unit 10 to be carried to the carriage position 6. The carriage position 6 is located on a rotation path of the housing units 8 arranged in a ring shape, for example, and is set between the carriage destination 14 of the housed object 4 and the transferring unit 12. As a result, the housed object 4 is transferred by the transferring unit 12 between the housing unit 8 at the carriage position 6 and the carriage destination 14.

The carrying unit 10 is an example of a carriage function of carrying the housing units 8 and is made up of, for example, a motor to rotate the housing units 8 arranged in a ring shape. When a carriage instruction for a predetermined housed object 4 is received, the housing unit 8 housing this housed object 4 is carried to and positioned at the carriage position 6. When a carriage instruction is received for housing the housed object 4 at the carriage destination 14 into the housing unit 8, the certain housing unit not housing the housed object 4 is carried to and positioned at the carriage position 6.

The transferring unit 12 is an example of means that transfers the housed object 4 between the housing unit 8 at the carriage position 6 and the carriage destination 14. The housed object 4 housed in the housing unit 8 positioned at the housing position 6 is transferred to the carriage destination 14 or the housed object 4 is transferred from the carriage destination 14 to the housing unit 8. The transferring unit 12 is disposed facing the carriage destination 14 of the housed object 4 with the housing unit 10 existing therebetween, for example.

The carriage destination 14 is an example of a carriage destination of the housed object 4 carried from the housing unit 8 and includes, for example, a drive device of the library apparatus that loads or ejects a housed recording medium.

Figure 2:
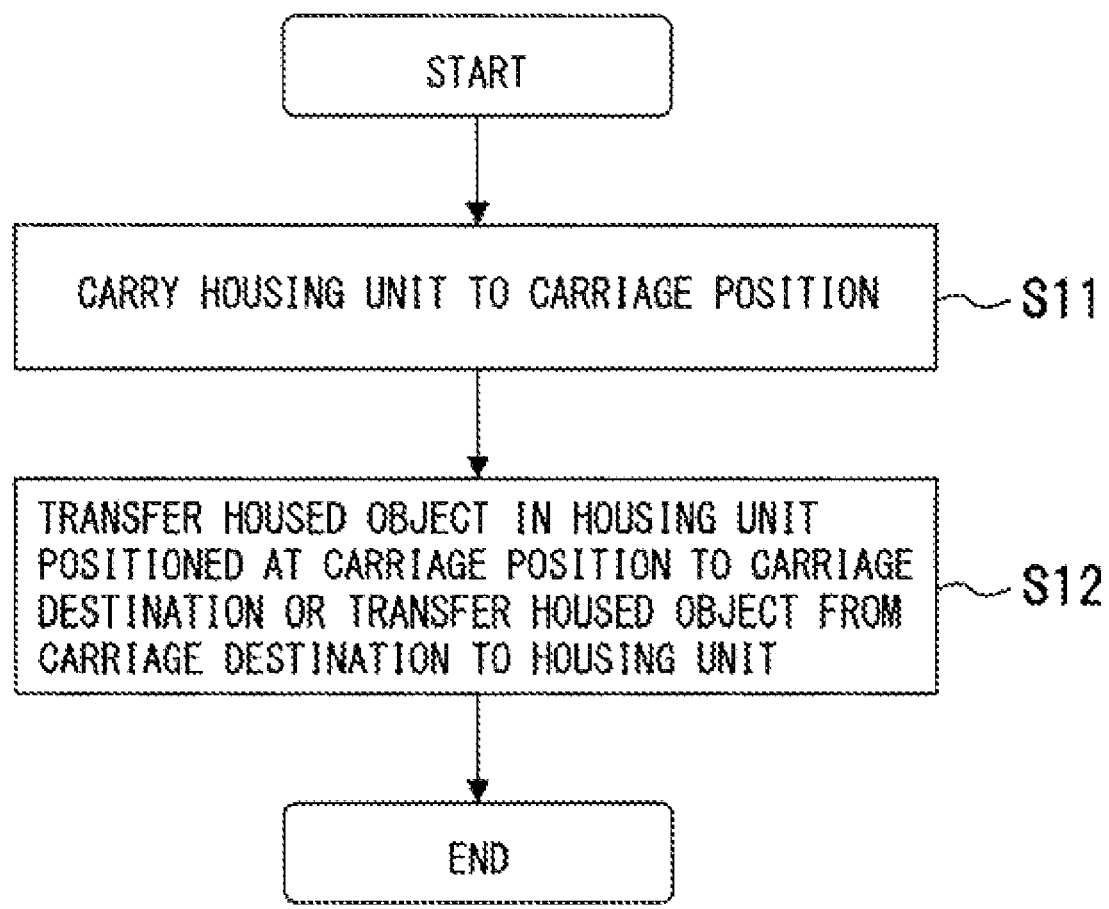
FIG. 2 is a flowchart of an example of a carriage process of a housed object.

A carriage process will be described with reference to FIG. 2. FIG. 2 is a flowchart of an example of the carriage process of the housed object. The process details, procedures, etc., depicted in FIG. 2 are by way of example and not limitation.

This process is an example of a housing method and is executed by a housing apparatus including a carrying unit that carries a housing unit housing a housed object to a carriage position. In this carriage process, as depicted in FIG. 2, the housing unit 8 is carried to the carriage position (step S11). That is, a plurality of the housing units 8 arranged in a ring shape are rotated and carried by the carrying unit 10 to be positioned at the carriage position 6. The transferring unit 12 disposed facing the carriage destination 14 is operated to transfer the housed object 4 in the housing unit 8 positioned at the carriage position 6 from the housing unit 8 to the carriage destination 14 or transfers the housed object 4 from the carriage destination 14 to the housing unit (step S12).

In the carriage process of the housing apparatus 2, the execution control may be performed, for example, through a computer program for the control of the functional units.

With this configuration, the housed object carried to the carriage position by the housing unit may be transferred by the transferring unit with a simple configuration disposed facing the carriage destination. The configuration of carrying the housed object to the carriage position by the housing unit may reduce the generation of a waste space that makes the carrying unit inaccessible to the housing unit and may improve the housing efficiency even if a multiplicity of housed objects are housed in a limited housing space.

Second Embodiment

A second embodiment relates to a library apparatus that carries a cartridge by the housing unit and the carrying unit to transfer the cartridge to the carriage destination by the transferring unit as an example of the housing apparatus.

Figure 3:
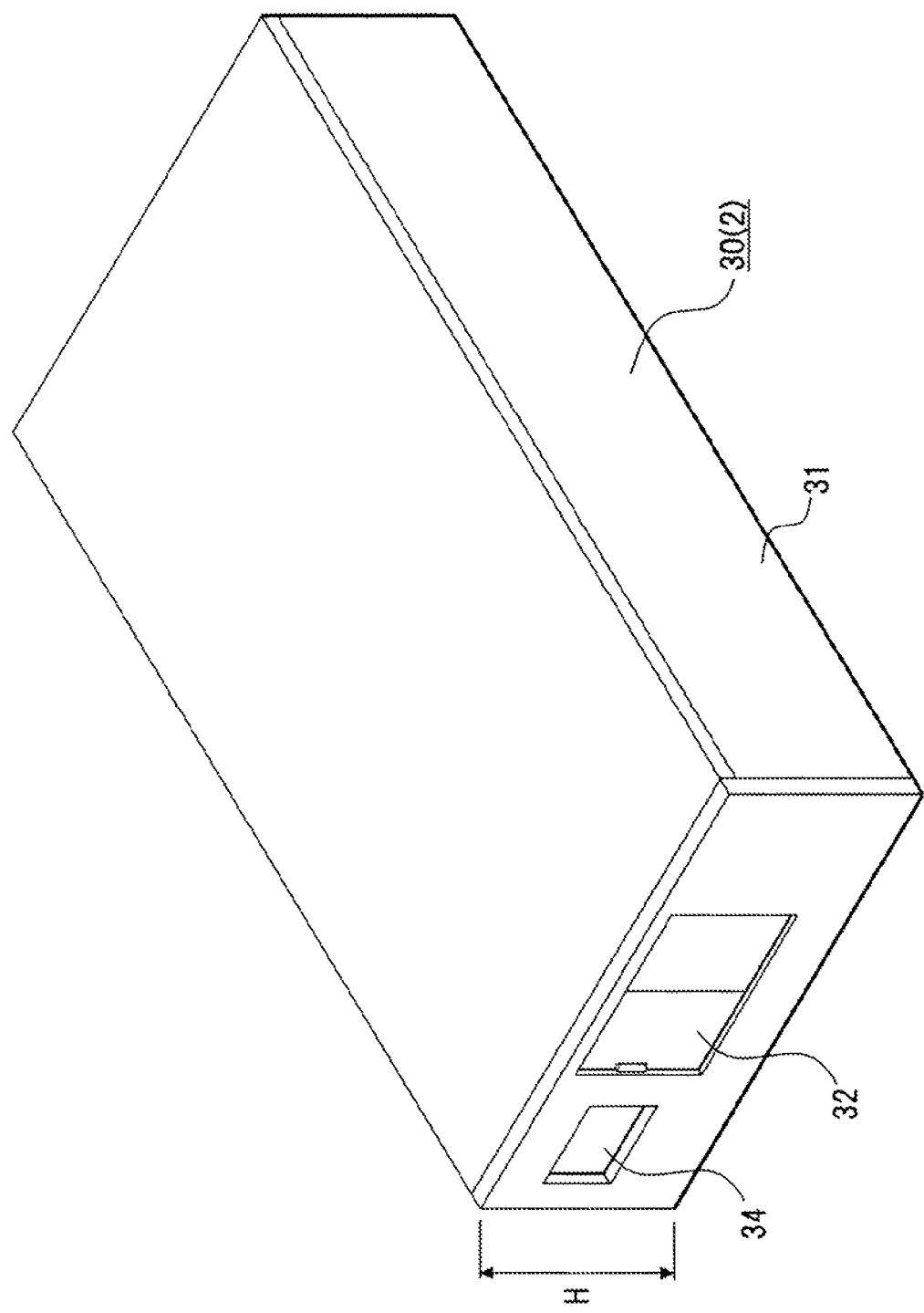
FIG. 3 is a diagram of an exemplary appearance configuration of a library apparatus according to a second embodiment.
Figure 4:
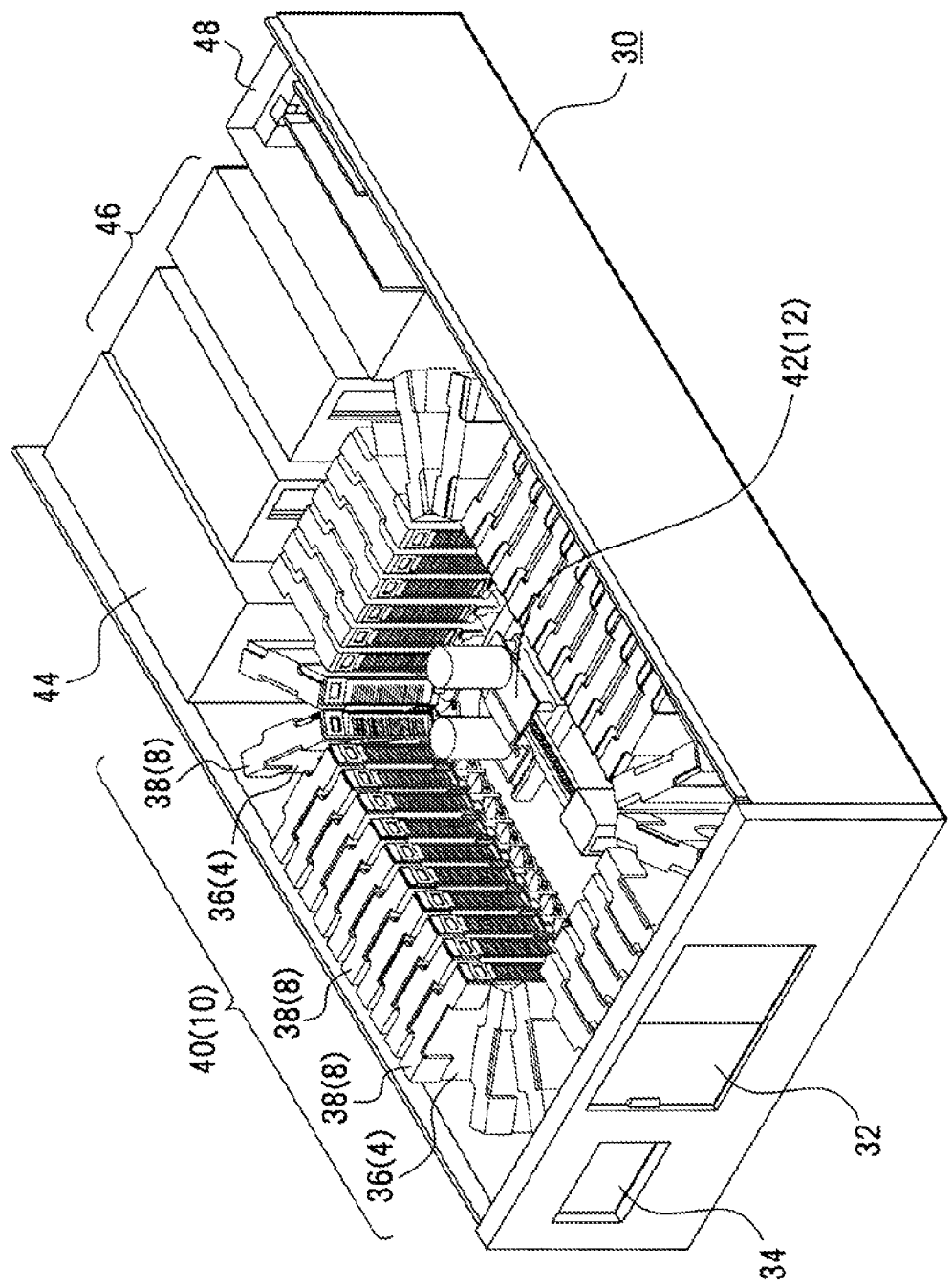
FIG. 4 is a perspective view of an exemplary internal configuration of the library apparatus.
Figure 5:
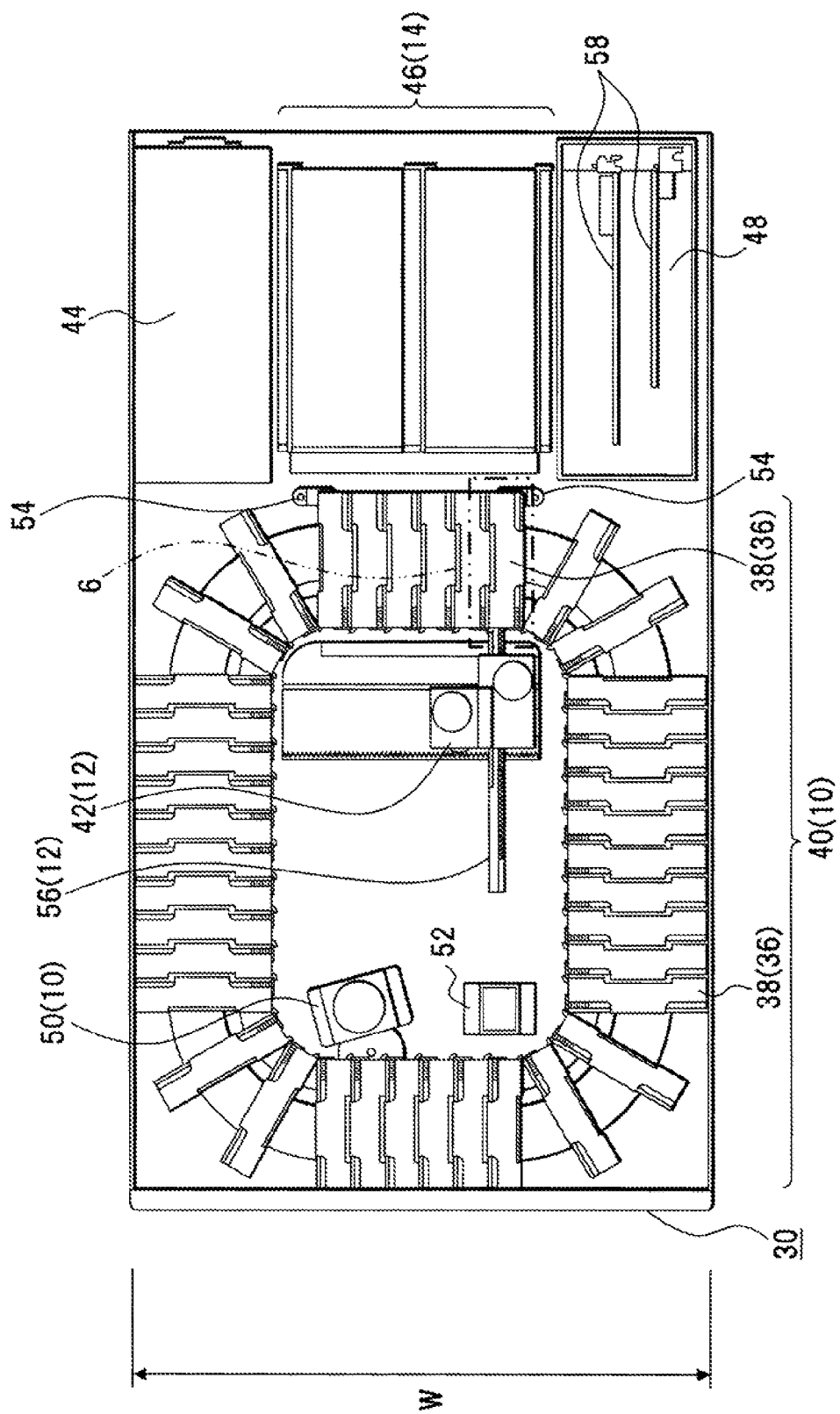
FIG. 5 is a plan view of the exemplary internal configuration of the library apparatus.

The second embodiment will be described with reference to FIGS. 3, 4, and 5. FIG. 3 is a diagram of an exemplary appearance configuration of a library apparatus according to the second embodiment; FIG. 4 is a perspective view of an exemplary internal configuration of the library apparatus; and FIG. 5 is a plan view of the exemplary internal configuration of the library apparatus. The configurations depicted in FIGS. 3, 4, and 5 are by way of example and not limitation of the present invention.

A library apparatus 30 is an example of the housing apparatus, the housing method, and the library apparatus and houses and stores a plurality of recording mediums that are housed objects. The library apparatus 30 houses, for example, a plurality of cartridges with magnetic recording tapes built-in as recording mediums that are the housed objects 4. The library apparatus 30 has a carriage function of carrying a specified cartridge to a predetermined carriage destination such as the disposed position of the drive device, etc.

As depicted in FIG. 3, the library apparatus 30 is, for example, a rack-mount type and has a height H set in accordance with a predetermined standard, for example. The library apparatus 30 includes a housing 31 made of metal or resin such as plastic, for example, and has a window 32 for inserting or ejecting a cartridge 36 (FIG. 4) and an operation panel 34 formed on the front side, for example. An interface unit, etc., may be formed on the backside for connection with a server apparatus, a host computer, etc., that are external devices.

As depicted in FIG. 4, the library apparatus 30 includes inside on the front side a cell group 40 with a plurality of cells 38 connected in a ring shape, i.e., the housing units 8 housing the cartridges 36, and a Rob unit 42 disposed to be surrounded inside the ring of the cell group 40. For example, a power source unit 44, a drive device 46, and a shelf unit 48 are made up on the rear side of the library apparatus 30. As depicted in FIG. 5, a drive motor 50 and a bar-code reader 52 are disposed to be surrounded inside the ring of the cell group 40 and a positioning sensor 54, etc., are also included.

The cell group 40 makes up the carrying unit 10 that rotates as depicted in FIG. 5 to carry the cells 38 or the cartridges 36 housed in the cells 38 to the carriage position 6, and is an example of a housing unit or a storage unit of the cartridges 36. The cell group 40 makes up a housing chain formed by coupling a plurality of the cells 38 that house the cartridges 36. When the cartridges 36 are carried, the coupled cell group 40 is rotated in a circulating manner along wall surfaces inside the library apparatus 30 to be carried to the predetermined carriage position 6.

The Rob unit 42 is an example of the transferring unit 12 that transfers the cartridges 36 between the cells 38 that are the housing units 8 at the carriage position 6 and, for example, the drive device 46 that is the carriage destination 14 and is made up of a robot, for example. The Rob unit 42 is disposed within the ring of the cell group 40 making up the carrying unit as above and is disposed facing the drive device 46 with the cell group 40 existing therebetween. The Rob unit 42 transfers to the drive device 46 the cartridge 36 carried by the cell group 40 to the predetermined carriage position 6, for example, the insert port side of the drive device 46. The Rob unit 42 also pulls out and transfers the cartridge ejected from the drive device 46 to the specified cell 38. The Rob unit 42 includes, for example, an arm 56 as a taking-out/putting-in mechanism that is the transferring unit of the cartridge 36 housed in the cell 38, for example.

The Rob unit 42 is movable in parallel with the disposed drive device 46 with the cells 38 of the cell group 40 existing therebetween. Therefore, if a plurality of the drive devices 46 are disposed, the cartridges 36 may be transferred through the parallel movement and the backward and forward operation of the arm 56.

The power source unit 44 is an example of a power feeding unit of the library apparatus 30 and is supplied with an electric current from an AC source, for example. The power feeding unit is not limited to the use of the external AC source and may include a power supply battery (Battery), for example.

The drive device 46 is an example of the carriage destination 14 of the cartridge 36 disposed at the carriage position 6. One or a plurality of the drive device 46 is arranged within the library apparatus 30 to write data received from an external server, a host computer, etc., into the cartridge 36 or to read and transmit data, etc., recorded on the cartridge 36 to the server, etc.

The drive device 46 is disposed facing the Rob unit 42 on the rear side of the cell group 40 in the library apparatus 30, for example. If a plurality of the drive devices 46 are included, the drive devices 46 are disposed in parallel with the cell group 40. This enables the cartridge 36 housed in the cell 38 positioned at the predetermined carriage position 6 to be received by the drive device 46 through the parallel movement of the Rob unit 42 and the backward and forward operation of the arm 56. Therefore, the operational configuration of the arm 56 included in the Rob unit 42 may be simplified. The disposed positions of the Rob unit 42 and the cell group 40 are arranged not to cover the disposed position of the drive device 46 and the drive device 46 may easily be disposed or replaced.

The shelf unit 48 is an example of a control unit of the library apparatus 30 and has a plurality of control printed boards 58 inserted, for example. The shelf unit 48 acts as a carriage control unit for the specified cartridge 36 to perform the position determination control described later, the rotation control of the cell group 40, the taking-out/putting-in control of the Rob unit 42, the movement control, etc. For example, in the carriage control, a process of carrying the specified cartridge 36 to the carriage position 6 is synchronized with a process of transferring the cartridge 36 to the drive device 46 by the Rob unit 42 or a process of taking the cartridge 36 into the cell 38 from the drive device 46.

The drive motor 50 is an example of a rotating mechanism that rotates the cell group 40 making up the housing chain or an example of the carrying unit 10 that rotates the cell group 40 to carry the housed object 4. For example, in accordance with the pulse control by the control unit for the drive motor 50, the rotation of the cell group 40 is controlled to carry the specified cell 38 to the predetermined carriage position 6. In this pulse control, for example, tacho-pulse control is performed for the control of the number of rotations of the drive motor 50.

The bar-code reader 52 is an example of an identifying unit that identifies the housed cartridge 36, etc., or a position determining unit that determines the position of the rotating cartridge 36. For example, the bar-code reader 52 reads and identifies ID (Identifier) information printed on bar-code labels (Barcode) affixed to the cartridges 36 to record the housing order of the cartridges 36 housed in the cell group 40. In the carriage control, the position of the specified cartridge 36 is determined and transmitted to the control unit to calculate the distance of the rotation of the cell group 40 by the drive motor 50. Although a bar-code that is identification information is affixed to the cartridge 36, the bar-code may be affixed to the cells 38, for example. Therefore, for example, the cartridges 36 may be recorded in combinations with the housing cells 38.

The positioning sensor 54 is an example of a position adjusting unit of the rotated cell 38 and positions the stopping position of the cell 38 at the carriage position 6, i.e., the position that enables the transfer by the Rob unit 42 to the disposed position of the drive device 46. That is, the detection position of the positioning sensor 54 indicates the predetermined carriage position 6 as above. Based on the detection by the positioning sensor 54, the rotation control of the cell group 40 is performed such that the cartridge 36 and the insert port of the drive device 46 are linearly aligned in the movement direction of the arm 50 of the Rob unit 42.

The library apparatus 30 according to this embodiment houses a plurality of the cartridges 36 in the longitudinally oriented state with the cell group 40 making up the housing chain. As depicted in FIG. 5, the cell group 40 has a rotation distance set in accordance with a width W of the library apparatus 30. The width W may be set in accordance with the disposed widths of the power source unit 44, the drive device 46, and the shelf unit 48 disposed on the rear side of the library apparatus 30, for example. The height H (FIG. 3) is formed, for example, as a 4U (Unit) size in accordance with a predetermined standard as above to enable the cartridges 36 that is the housed objects to be longitudinally placed and housed in a single step.

The cartridges 36 are rotated and carried to the predetermined carriage position 6 by the cell group 40 and are transferred to/from the drive device 46 by the Rob unit 42 disposed within the ring of the cell group 40.

The carriage function of the library apparatus 30 is formed with the inclusion of the cell group 40 that is the carrying unit 10 and the Rob unit 42 that is the transferring unit 12. In such a configuration, the number of the cells 38 capable of being housed is determined in accordance with the width W of the library apparatus 30 and a lot of the cartridges 36 may be housed even if the cartridges 36 are longitudinally placed.

Figure 6:
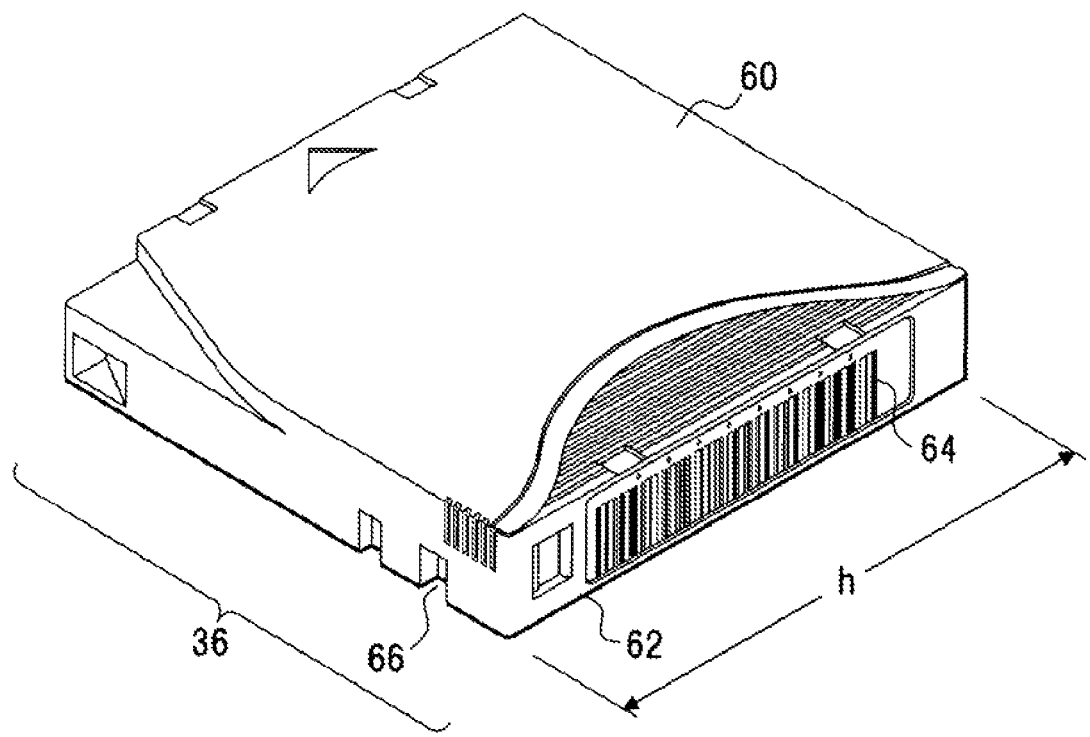
FIG. 6 is a diagram of an exemplary configuration of a cartridge.

A configuration of the housed object will be described with reference to FIG. 6. FIG. 6 is a diagram of an exemplary configuration of the cartridge. The configuration depicted in FIG. 6 is by way of example and not limitation.

The cartridge 36 is an example of the housed object 4 and is made of, for example, a plastic housing 60 and has a magnetic tape that is a recording medium for data, etc., wound on a reel and housed therein, as depicted in FIG. 6. The cartridge 36 includes a partial piece 62 formed with a length h and is housed with the length h of the piece 62 defined as the height direction of the cartridge 36 when being housed in the longitudinally oriented state in the cell 38 that is the housing unit as above.

To the housing 60, a bar-code label 64 with ID, etc., printed is affixed, and the cartridge 36 is identified by the above bar-code reader 52. One or a plurality of groove 66 is formed at one end of the housing 60. The grooves 66 are engaged with the arm 56 of the Rob unit 42 at the time of carriage to the drive device 46 or carriage from the drive device 46 to the cell 38, for example.

Figure 7:
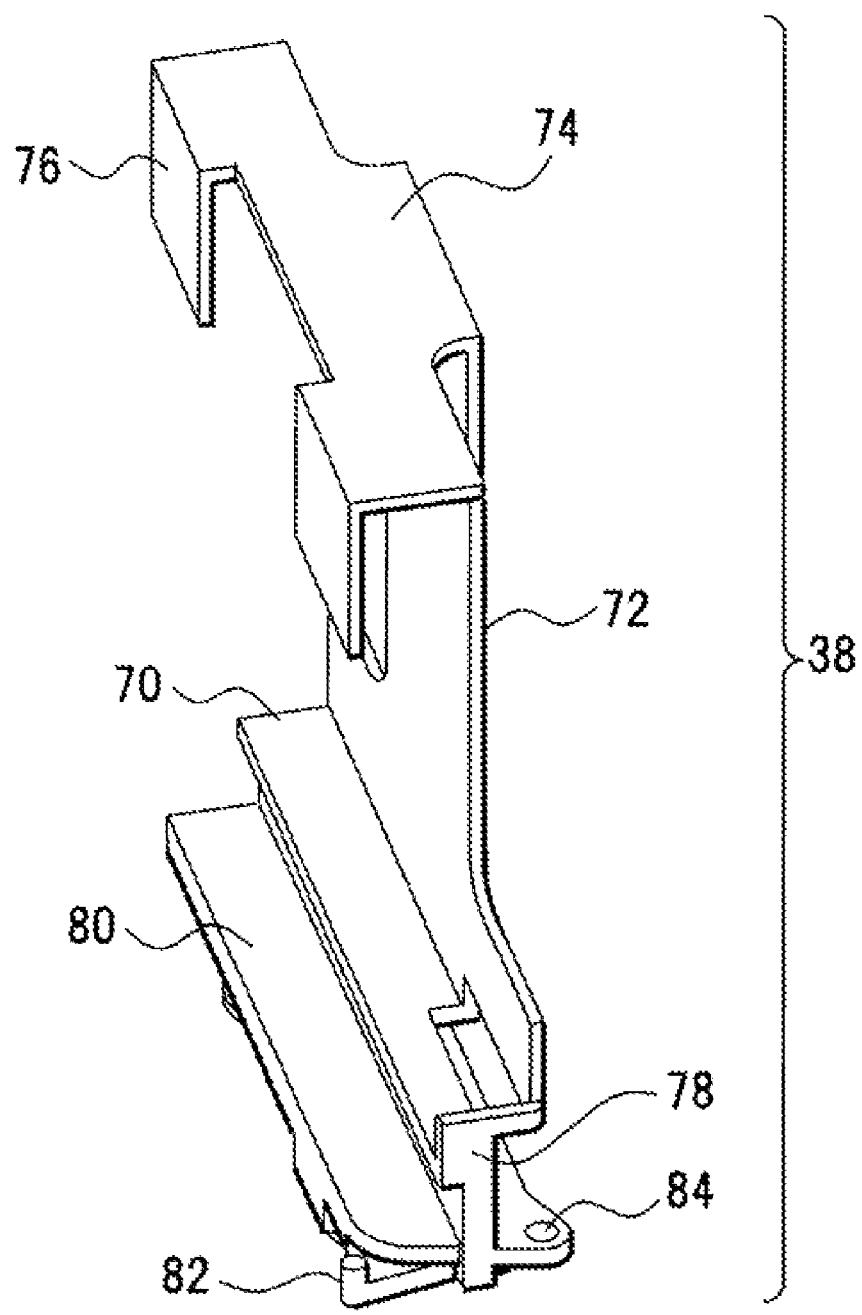
FIG. 7 is a diagram of an exemplary configuration of a cell of the library apparatus.
Figure 8:
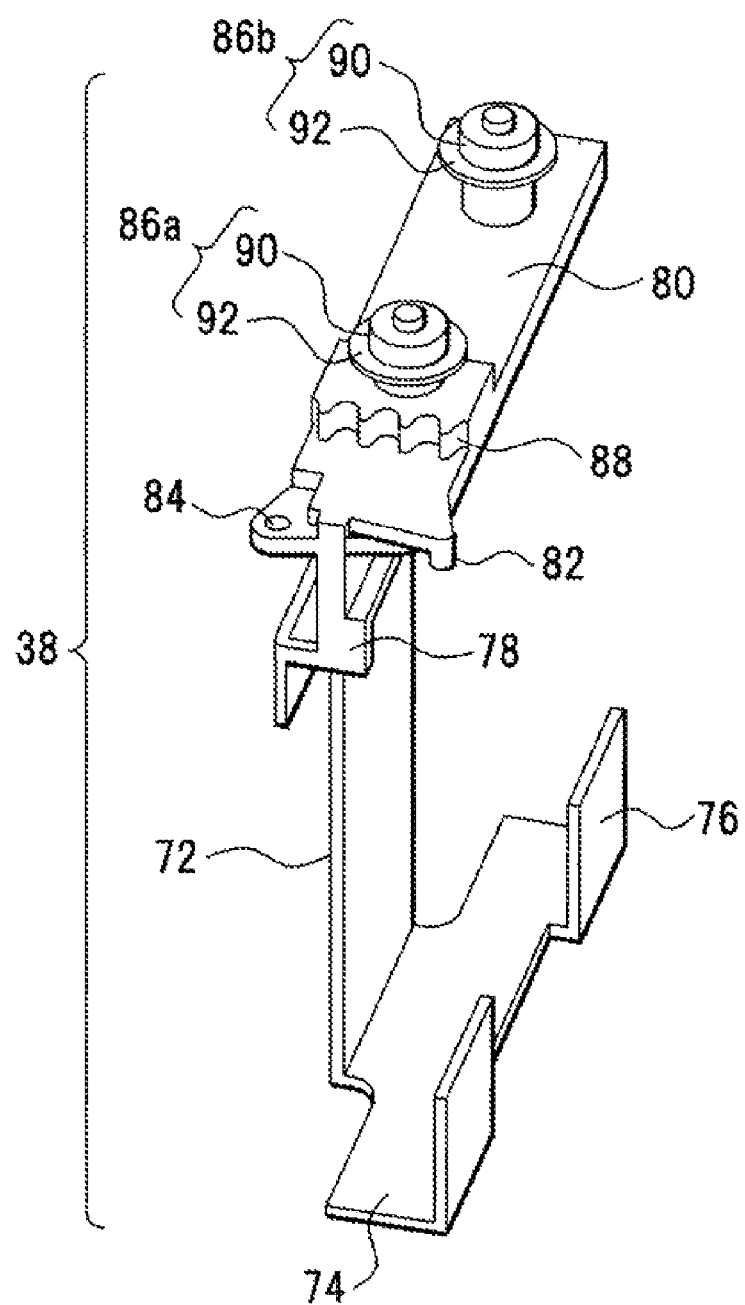
FIG. 8 is a diagram of an exemplary configuration on the bottom side of the cell.
Figure 9:
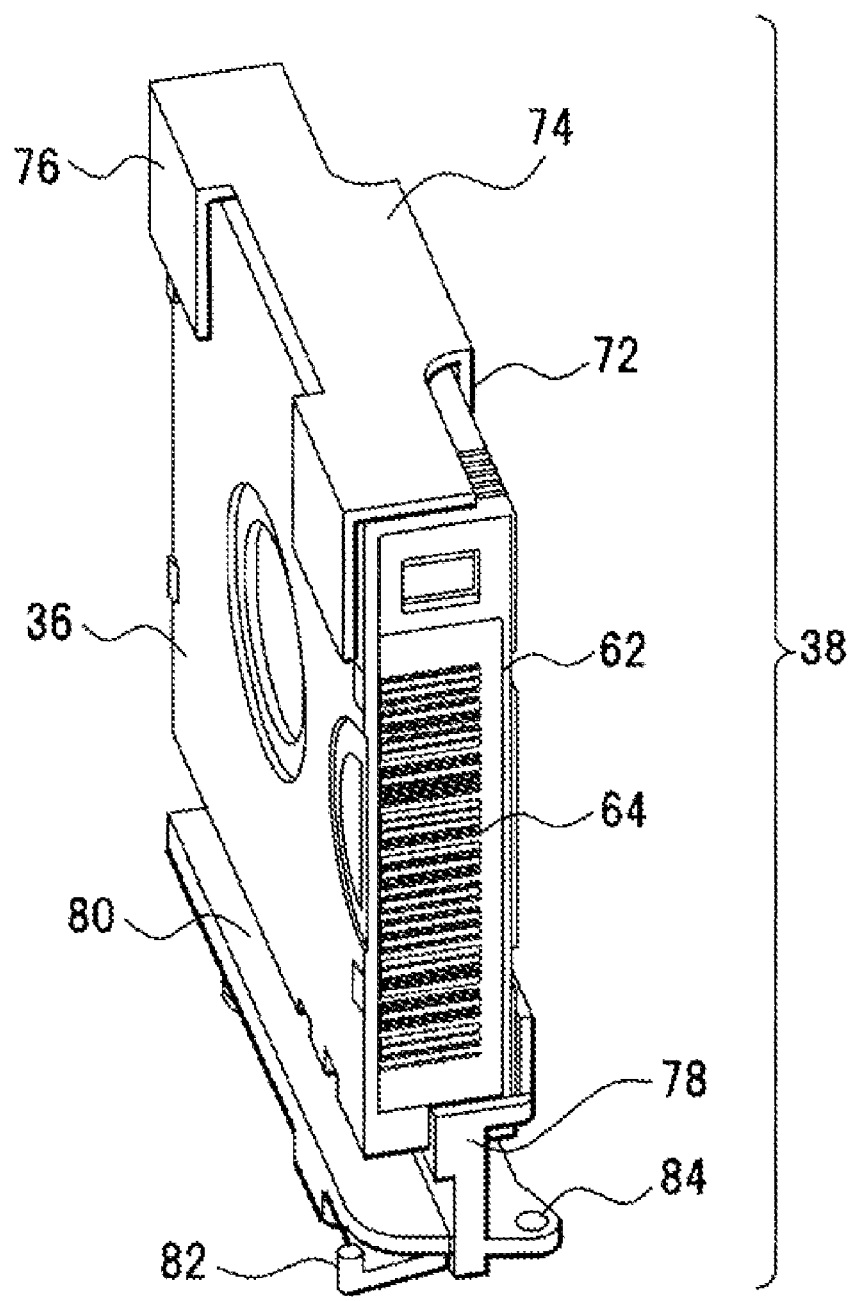
FIG. 9 is a diagram of an exemplary configuration of the cell with the cartridge housed.
Figure 10:
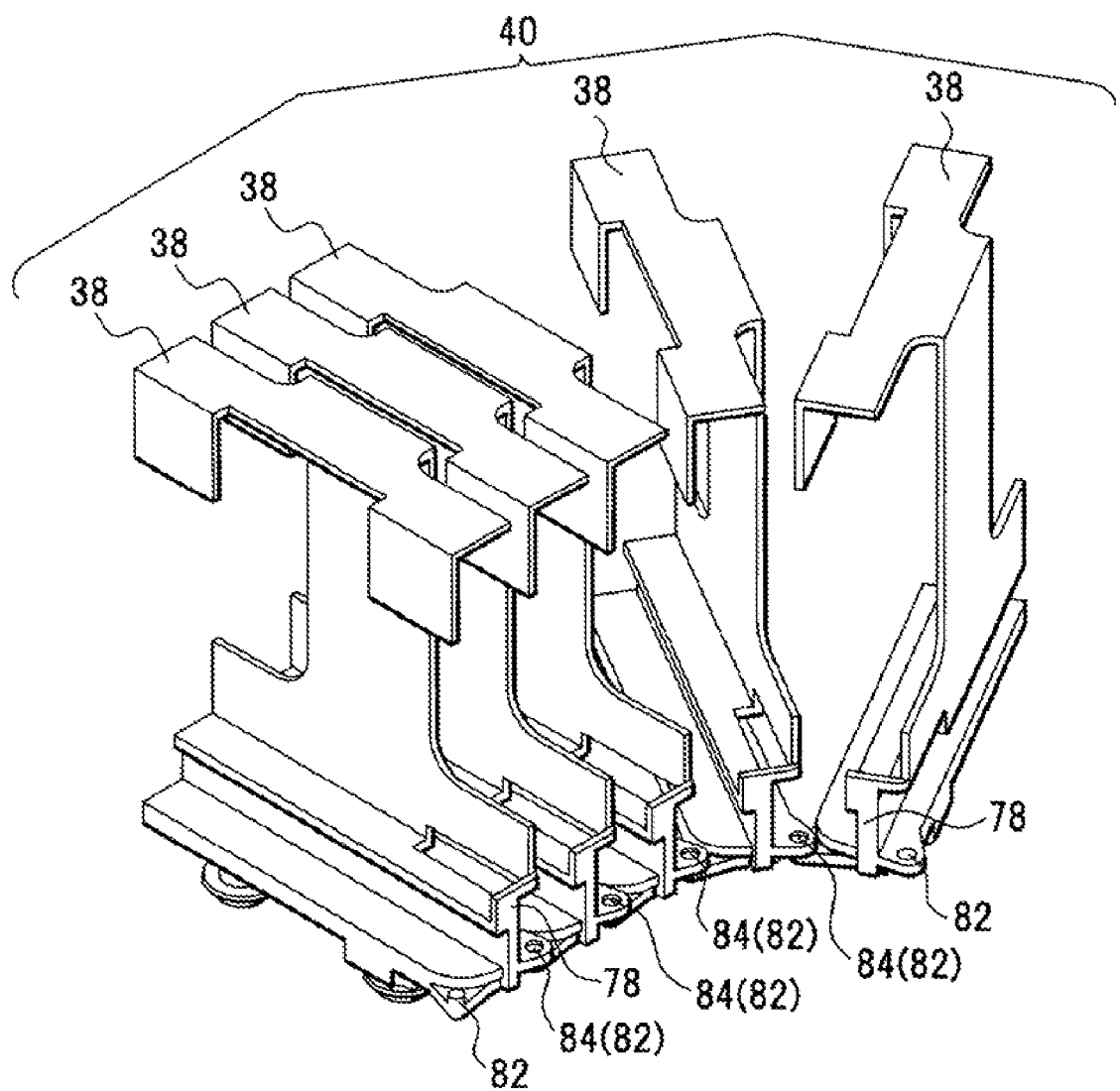
FIG. 10 is a diagram of an exemplary configuration of a coupled cell group of the library apparatus.
Figure 11:
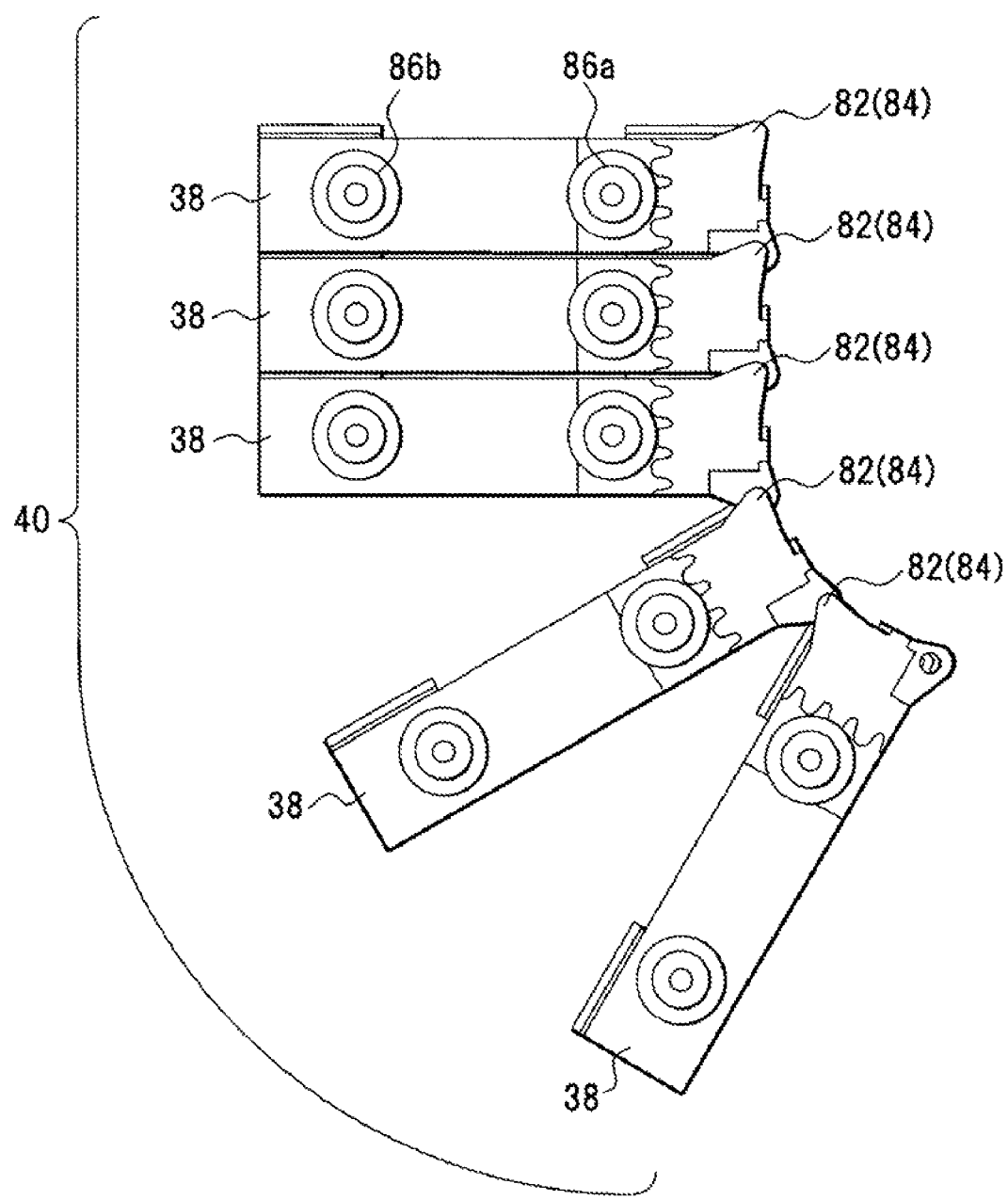
FIG. 11 is a diagram of an exemplary configuration on the bottom side of the cell group.
Figure 12:
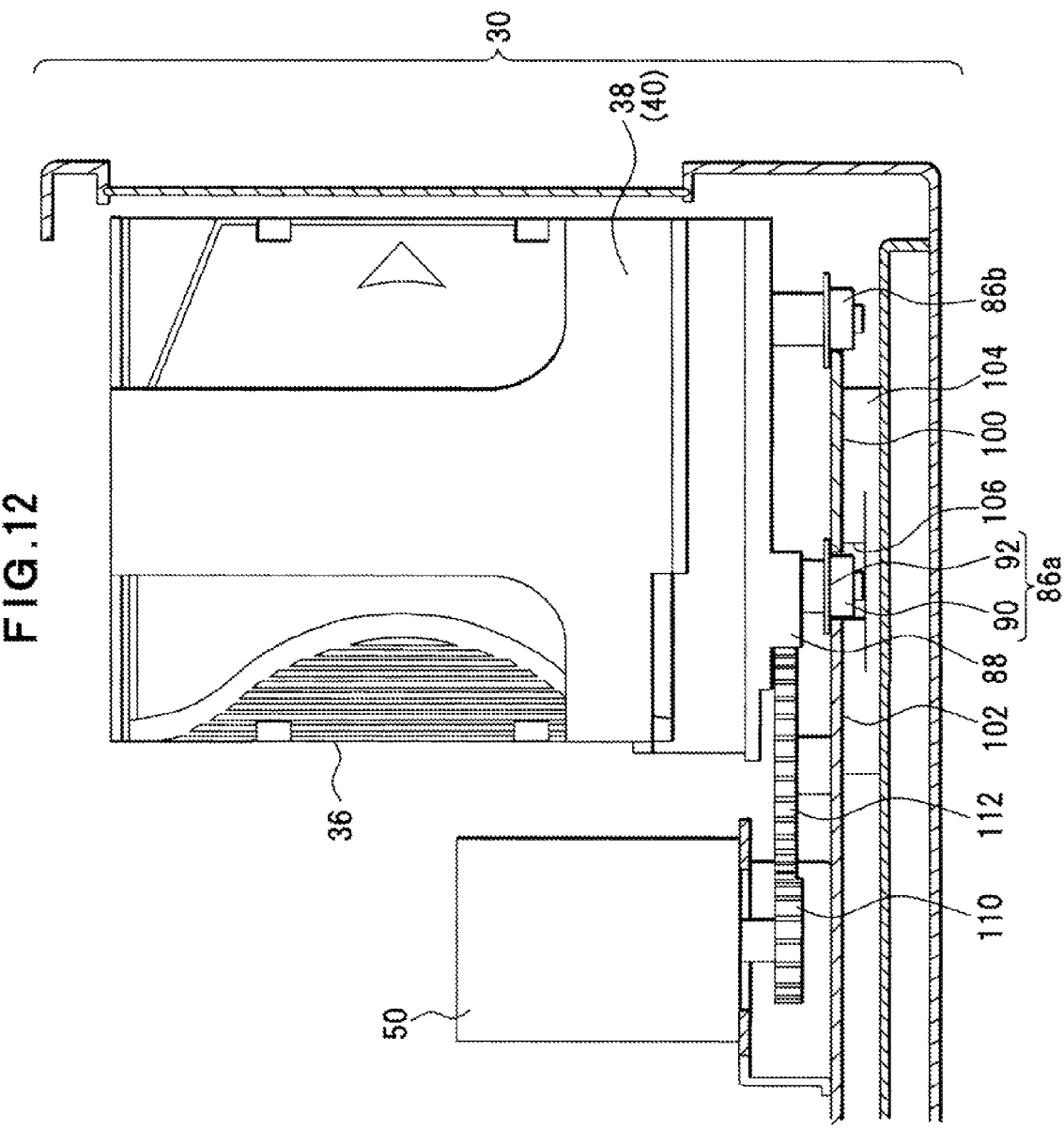
FIG. 12 is a diagram of an exemplary configuration of a rotating mechanism of the cell group.

An exemplary configuration of the housing unit will be described with reference to FIGS. 7, 8, 9, 10, 11, and 12. FIG. 7 is a diagram of an exemplary configuration of the cell of the library apparatus; FIG. 8 is a diagram of an exemplary configuration on the bottom side of the cell; FIG. 9 is a diagram of an exemplary configuration of the cell with the cartridge housed; FIG. 10 is a diagram of an exemplary configuration of the coupled cell group of the library apparatus; FIG. 11 is a diagram of an exemplary configuration on the bottom side of the cell group; and FIG. 12 is a diagram of an exemplary configuration of a rotating mechanism of the cell group. The configurations depicted in FIGS. 7, 8, 9, 10, 11, and 12 are by way of example and not limitation.

The cell 38 is an example of the housing unit 8 that houses and retains the cartridge 36 that is the housed object as depicted in FIG. 7 and includes a mounting unit 70 for mounting the cartridge 36, a side supporting unit 72, a ceiling supporting unit 74, and a standing wall unit 76, for example. When the cartridge 36 is housed into or pulled out from the cell 38, the cartridge 36 is slid along the side supporting unit 72 and the standing wall unit 76. For example, an end unit 78 is formed on the mounting unit 70 as a positioning unit at the end of the sliding of the cartridge 36.

A base unit 80 is included on the lower side of the cell 38 and the base unit 80 includes a pin 82 and a coupling hole 84 formed for making up the cell group 40 that is the housing chain having a plurality of cells 38 coupled in a ring shape.

As depicted in FIG. 8, for example, bearings 86a, 86b, a gear unit 88, etc., making up a rotating mechanism unit are formed on the bottom side of the base unit 80 of the cell 38. For example, a bearing unit 90 and a guide unit 92 are formed in each of the bearings 86a and 86b. The bearing unit 90 is caused to slide on a guide rail 100 (FIG. 12) disposed on the library apparatus 30 side to rotate the cell 38. The guide unit 92 is formed with a larger diameter than the bearing unit 90 to limit the mounting height of the bearing unit 90 when the cell 38 is mounted on the above guide rail 100. This holds the disposition heights of the cells 38 and the cartridges 36 constant in the cell group 40.

The gear unit 88 is an example of a power transmitting unit of the drive motor 50 that rotates the cell group 40 and is formed toward the inside of the ring of the cell group 40 arranged in a ring shape, for example.

When the cartridge 36 is housed in the cell 38, for example, as depicted in FIG. 9, the cartridge 36 is disposed in the above longitudinal orientation and housed such that a surface with the bar-code label 64 affixed faces the end unit 78 side. That is, in the cell group 40, the surface with the bar-code label 64 affixed faces the inside of the ring of the cell group 40 with the bar-code reader 52 disposed.

For example, as depicted in FIGS. 10 and 11, the cell group 40 is coupled by engaging the pins 82 with the coupling holes 84 of the adjacent cells 38. In the cell group 40 arranged in a ring shape, the coupling side is located inside. By coupling the cells 38 with each other to form the housing chain, the movement amounts of the rotating cells 38 may be made constant.

For example, as depicted in FIG. 12, the guide rail 100 guiding the rotation of the cell group 40 and a mounting unit 102 for mounting the drive motor 50, the Rob unit 42, etc., are disposed as the configuration of the rotating mechanism unit that rotates the cell group 40. For example, a supporting member 104 is disposed on the under portion of the guide rail 100 and the mounting unit 102 for supporting and keeping the guide rail 100 and the mounting unit 102 at an equivalent level. The supporting member 104 is formed in an elliptical column shape and a portion thereof is provided with a groove 106 for inserting the bearing unit 90 of the bearing 86*a* of the cell 38. For example, a plurality of the supporting members 104 are disposed at predetermined intervals along the cell group 40 arranged in a ring shape. In such a configuration, for example, the cell 38 sandwiches the guide rail 100 with the bearings 86*a* and 86*b* and causes the bearing unit 90 to slide. Thereby, the cell 38 rotates.

For example, a first gear 110 rotated by the drive motor 50 and a second gear 112 engaged with the first gear 110 to transmit a drive force are included as an example of the power transmitting unit for the cell group 40. By engaging the gear 112 with the gear unit 88 of the cell 38, the cell group 40 receives the rotating power from the drive motor 50.

The power transmitting unit for the cell group 40 is not limited to the gear structure with the gears 110 and 112 and the gear unit 88 of the cell, and another means may be used for transmitting power from the drive motor 50 to the cell 38.

Figure 13:
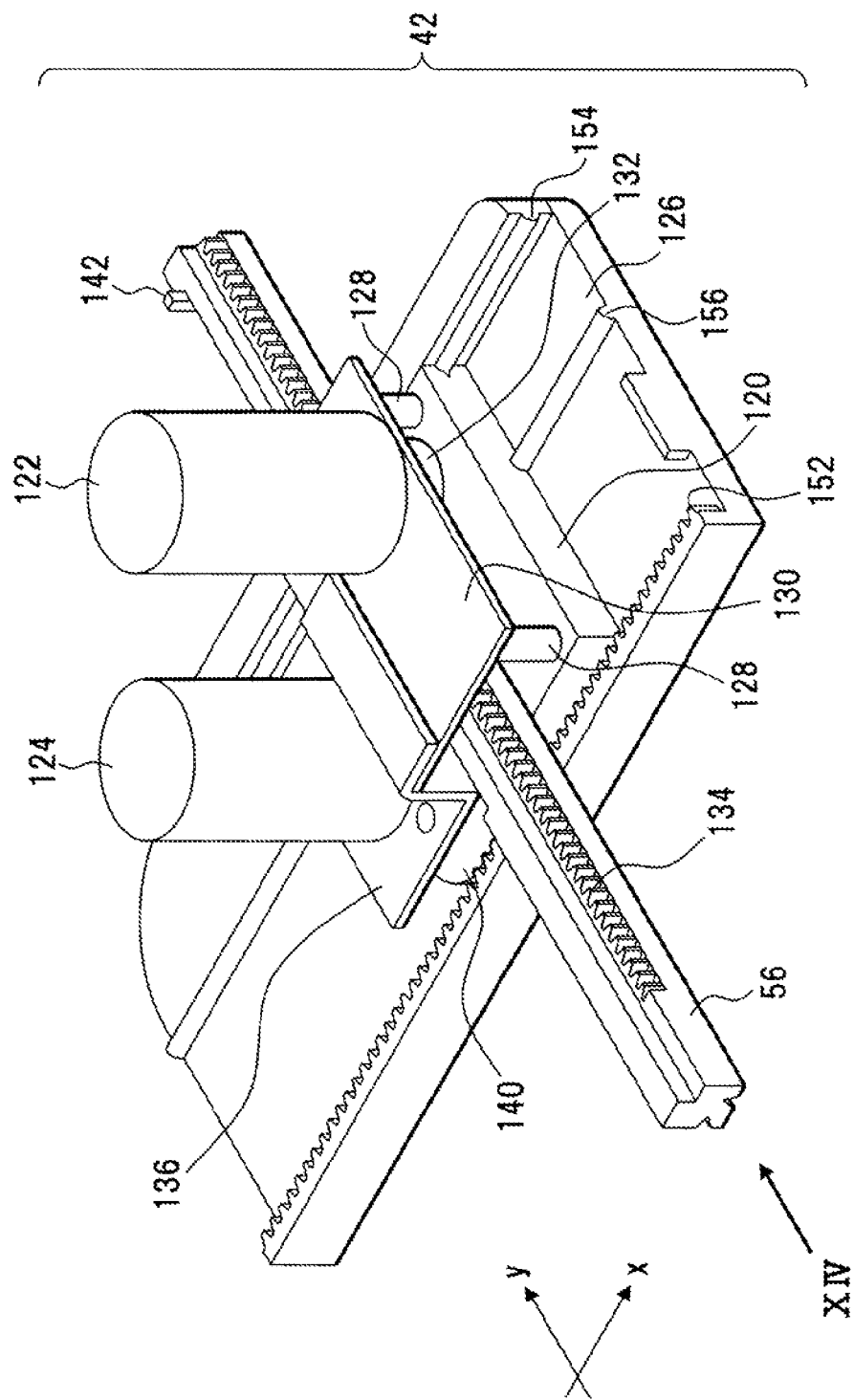
FIG. 13 is a diagram of an exemplary configuration of a Rob unit of the library apparatus according to the second embodiment.
Figure 14:
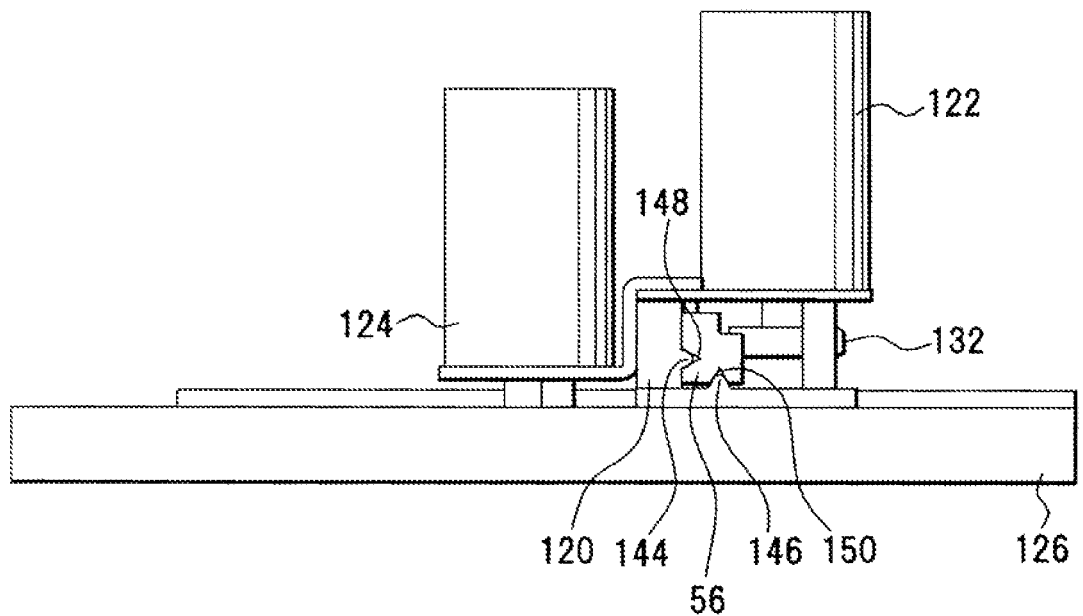
FIG. 14 is a view on arrow of the Rob unit depicted in FIG. 13.
Figure 15:
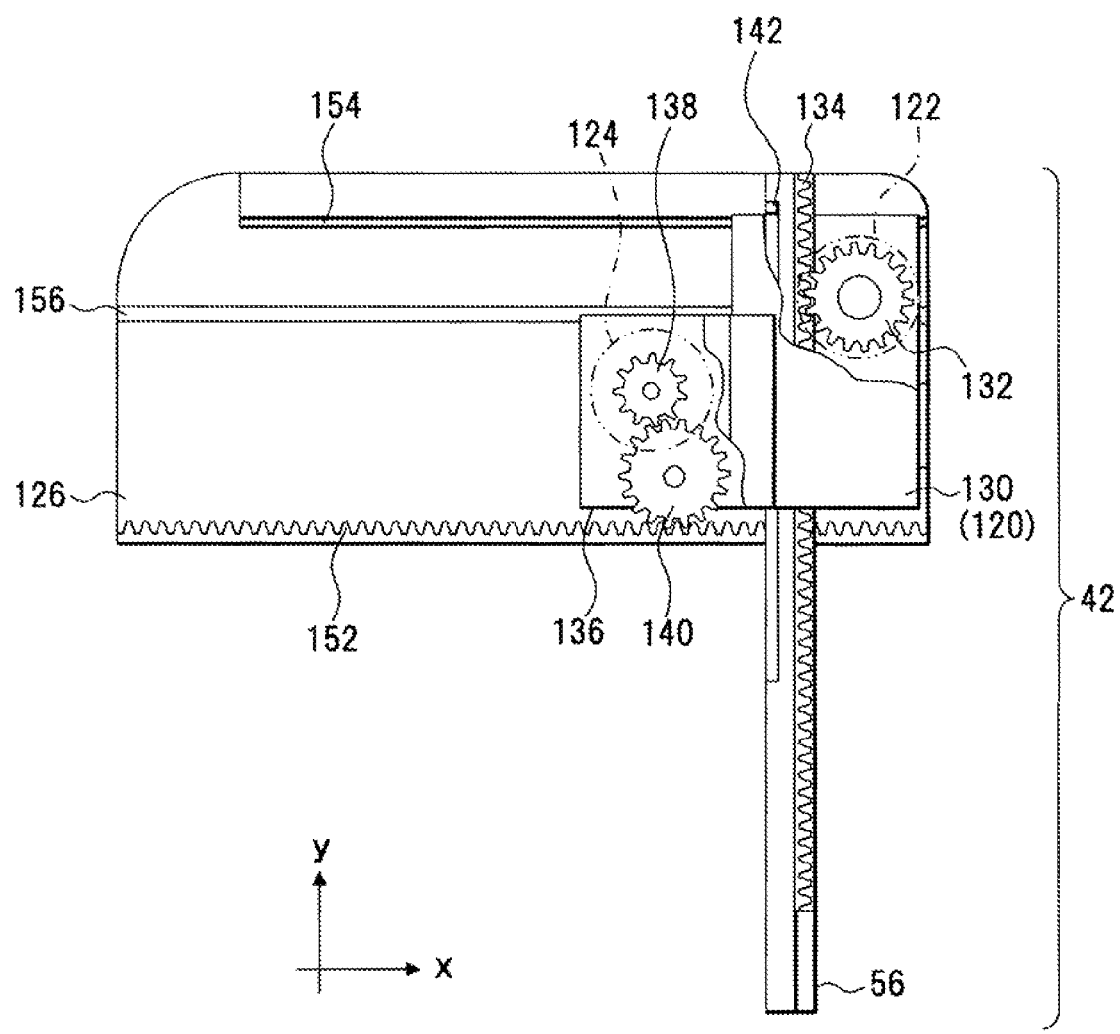
FIG. 15 is a plan view of an example of a partial cross section of the Rob unit.

An exemplary configuration of the transferring unit will be described with reference to FIGS. 13, 14, and 15. FIG. 13 is a perspective view of an exemplary configuration of the Rob unit of the library apparatus; FIG. 14 is a view on arrow of the Rob unit depicted in FIG. 13; and FIG. 15 is a plan view of an example of a partial cross section of the Rob unit. The configuration depicted in FIGS. 13, 14, and 15 are by way of example and not limitation.

The Rob unit 42 is an example of the transferring unit that transfers the housed object 4 from the housing unit 8 to the carriage destination 14 or from the carriage destination 14 to the housing unit 8. In this embodiment, the Rob unit 42 includes, for example, an arm base unit 120, the arm 56, a first drive motor 122, a second drive motor 124, and a guide unit 126 as depicted in FIG. 13. The Rob unit 42 moves the arm base unit 120, etc., in the positive and negative x-axis directions of FIG. 13 and moves the arm 56 in the positive and negative y-axis directions.

The arm base unit 120 makes up a main body unit of the Rob unit 42. A mounting unit 130 is disposed on the arm base unit 120 for mounting the drive motor 122 via a plurality of supporting members 128, for example, and the drive motor 122 is provided with a gear 132 via the mounting unit 130. The arm 56 has a gear unit 134 formed as a power transmitting unit. By engaging the gear 132 with the gear unit 134 of the arm 56, the drive power from the drive motor 122 may be transmitted to the arm 56.

A mounting unit 136 for mounting the drive motor 124 is disposed at one end of the arm base unit 120. As depicted in FIG. 15, the drive motor 124 is provided with a drive gear 138 via the mounting unit 136 and the drive gear 138 is engaged with a gear 140 that moves the arm base unit 120 in the x-axis direction.

The arm 56 transfers the cartridge 36 housed in the cell 38 to the drive device 46 and transfers the cartridge 36 from the drive device 46 to the cell 38. A claw unit 142 is formed as a taking-out/putting-in mechanism unit at the leading end of the arm 56 and, for example, the claw unit 142 is engaged with the groove 66 (FIG. 6) to pull out the cartridge 36. As depicted in FIG. 14, for example, the bottom surface and a side surface of the arm 56 have grooves 148 and 150 formed to be engaged with guide convex units 144 and 146 formed in the arm base unit 120 to limit the movement direction of the arm 56.

The drive motor 122 is an example of a drive unit for moving the arm 56 in the y-axis direction or a movement amount control unit for the arm 56. In the transfer process of the cartridge 36, for example, the number of rotations of the drive motor 122 may be controlled depending on the gear ratio between the gear unit 134 of the arm 56 and the gear 132, etc., to control the movement amount of the arm 56.

The drive motor 124 is an example of a drive unit that moves the arm base unit 120 in the x-axis direction or a movement amount control unit for the arm base unit 120. As depicted in FIG. 15, the drive gear 138 disposed via the mounting unit 136 is engaged with the gear 140 disposed on the mounting unit 136 and the gear 140 is engaged with a gear 152 of the guide unit 126. As a result, the drive force of the drive motor 124 is transmitted to the gear 152 of the guide unit 126 to move the arm base unit 120. In the movement amount control of the arm base unit 120, for example, the number of rotations of the drive motor 124 may be controlled as in the case of the above movement control of the arm 56.

The drive motor 124 performs the movement control of the arm base unit 120 in a cartridge transfer process described later to engage the claw unit 142 formed on the arm 56 with the groove 66 of the cartridge 36. In a conventional library apparatus, a drive motor is included and independently controlled for each operational system for the translation of a Rob unit and for the opening/closing operation for griping a cartridge with a claw unit. On the other hand, the above Rob unit 42 is capable of performing the translation of the arm base unit 120 and the engagement operation of the claw unit 142 through the movement control of the drive motor 124.

The guide unit 126 is an example of a movement control unit for the arm base unit 120 moving in the x-axis direction and has the gear 152 formed on one side surface, and a guide convex unit 154 formed on the opposite surface to be engaged with a surface of the arm base unit 120. A guide convex unit 156 is also included that is engaged with the bottom surface of the arm base unit 120.

Figure 19:
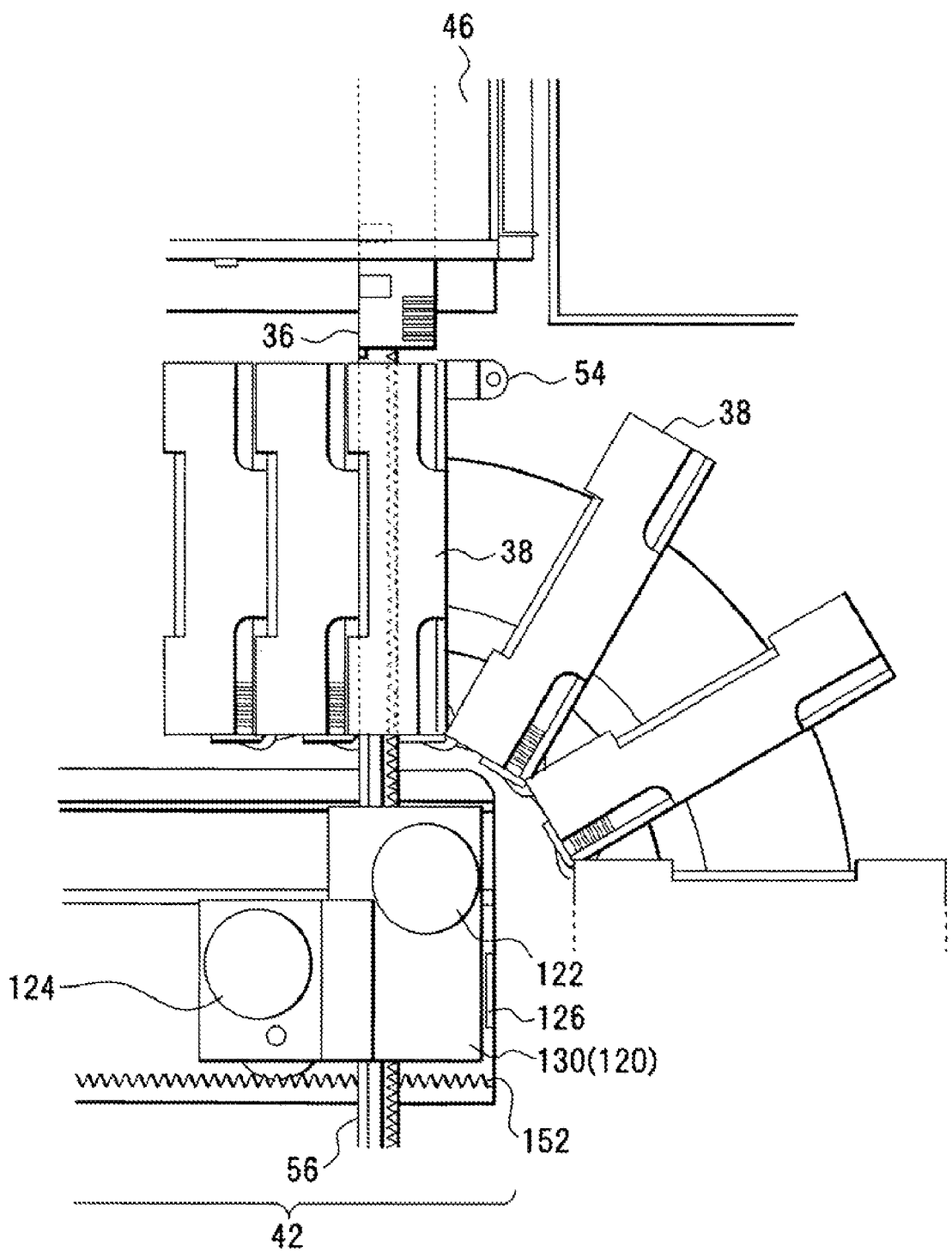
FIG. 19 is a diagram of an example of the stage of the cartridge transfer operation by the Rob unit.
Figure 20:
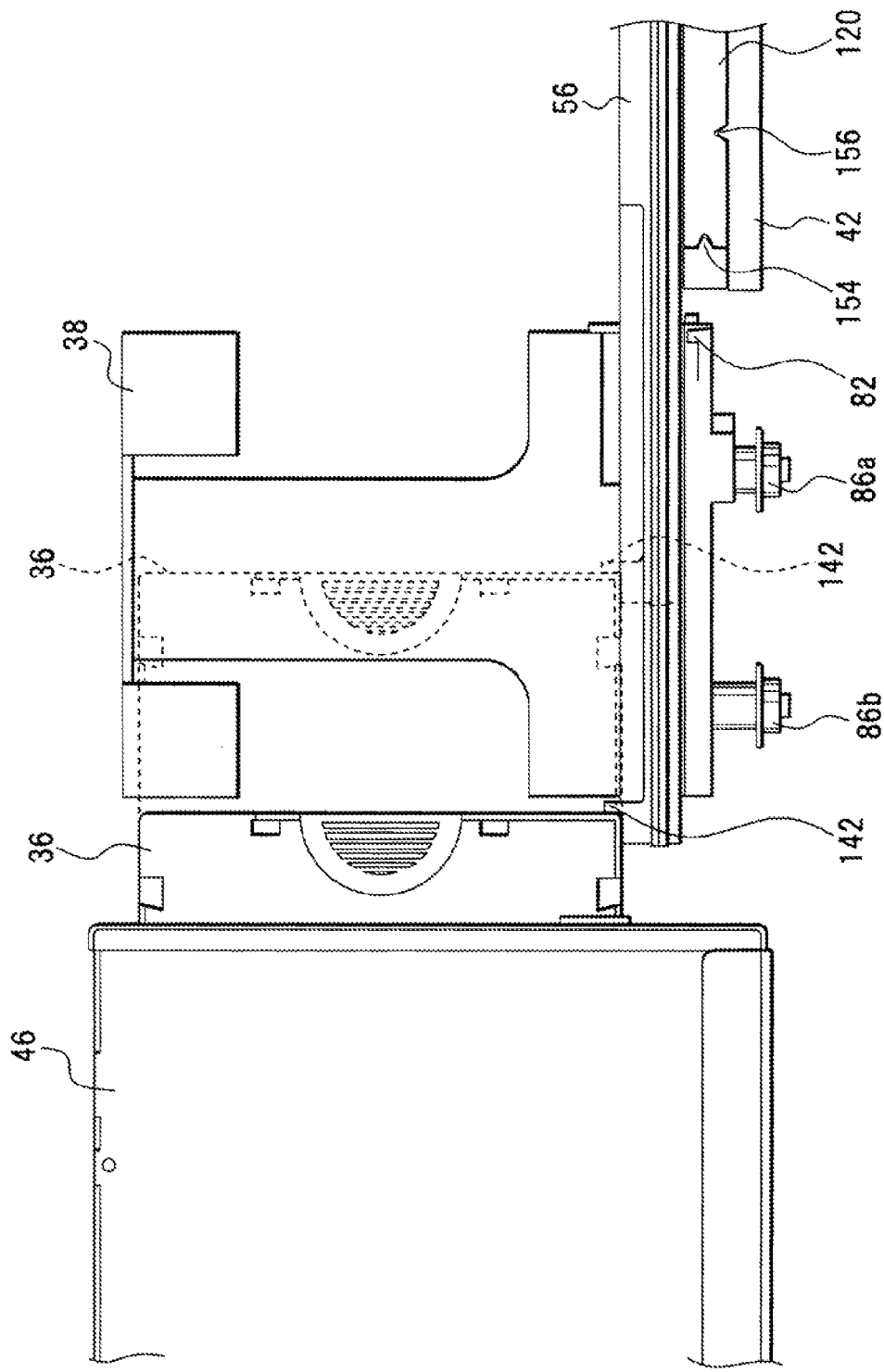
FIG. 20 is a diagram of an example of a cartridge transfer state by the arm.
Figure 21:
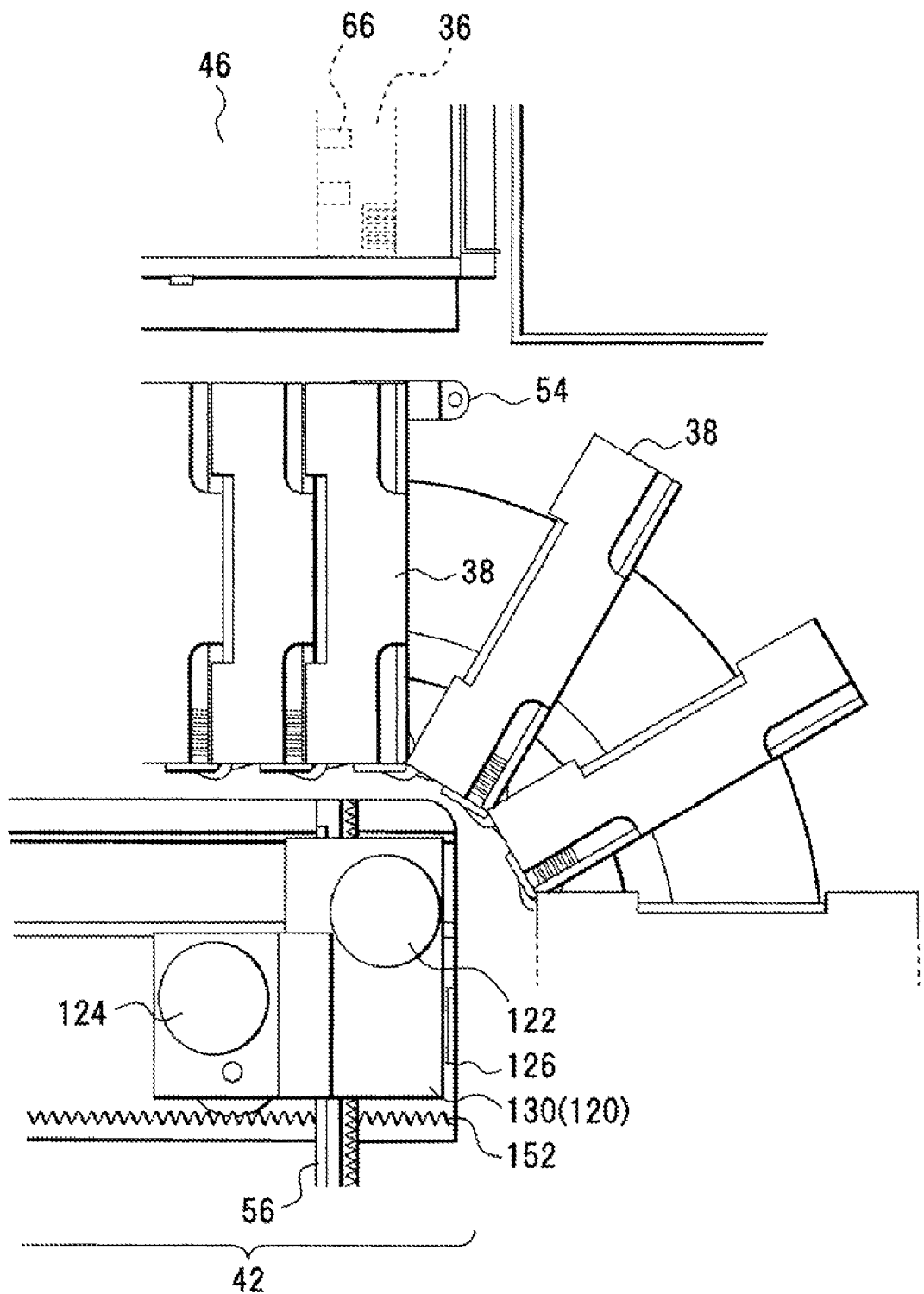
FIG. 21 is a diagram of an example of an arm movement process after the cartridge transfer.

An example of the transfer operation of the housed object by the transferring unit will be described with reference to FIGS. 16, 17, 18, 19, 20, and 21. FIGS. 16 to 19 are diagrams of an example of a stage of the cartridge transfer operation by the Rob unit; FIG. 20 is a diagram of an example of a cartridge transfer state by the arm; and FIG. 21 is a diagram of an example of an arm movement process after the cartridge transfer. The operation order, the configurations, etc., depicted in FIGS. 16 to 21 are by way of example and not limitation.

Figure 16:
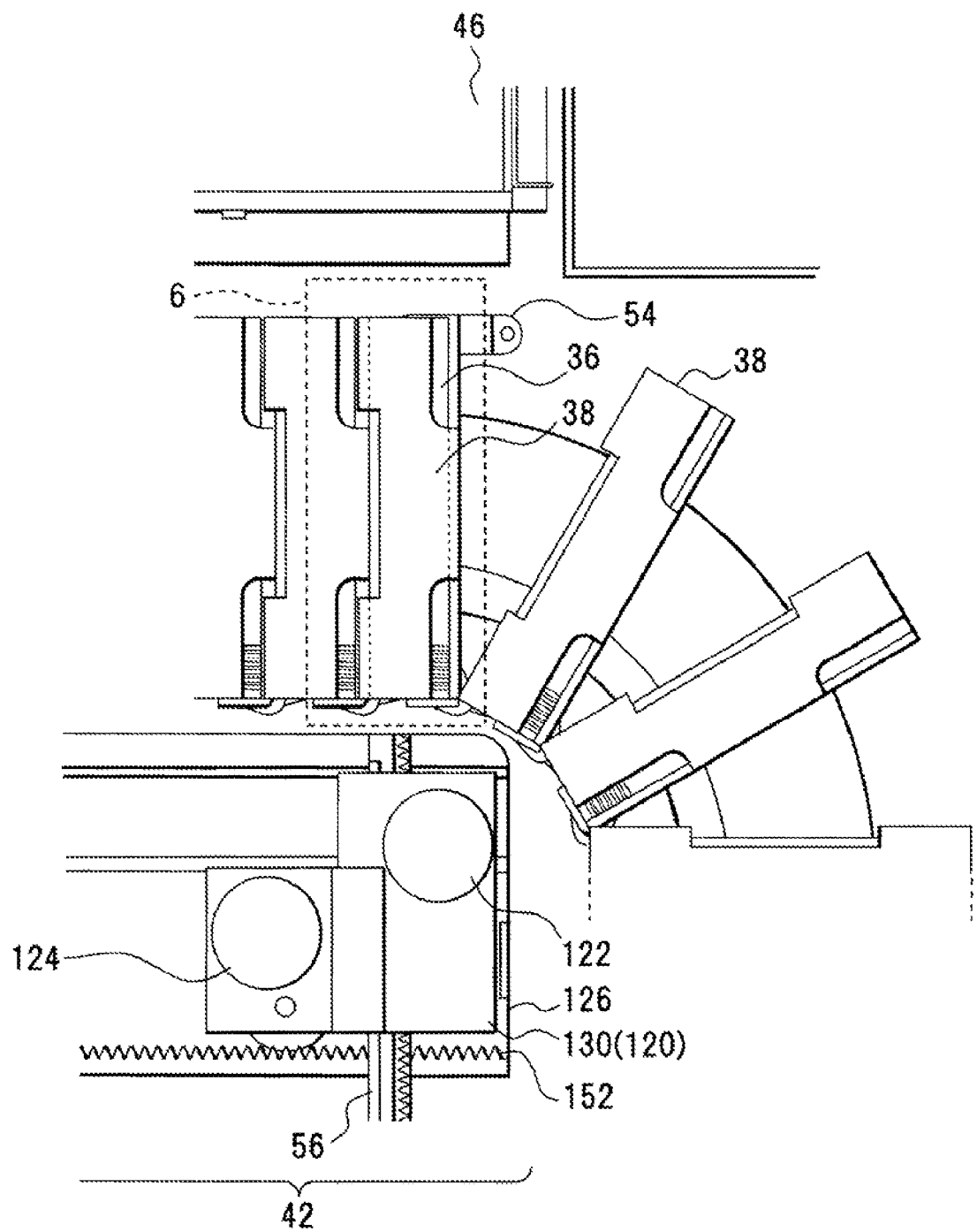
FIG. 16 is a diagram of an example of a stage of a cartridge transfer operation by the Rob unit.

This transfer operation represents an example of a process of transferring to the drive device 46 the cartridge 36 positioned at the predetermined carriage position 6 through the carriage of the cell 38 that is the housing unit 8. When the cell group 40 is rotated to carry the cell 38 housing the cartridge 36 that is the housed object 4 to the carriage position 6, i.e., in front of the specified drive device 46, the arm base unit 120 of the Rob unit 42 is moved toward the carriage position 6 as depicted in FIG. 16. For example, the position of the arm base unit 120 in this case is set as the initial position (stopper position) of the transfer process and the positional adjustment of the cell 38 to the carriage position 6 is performed by the positioning sensor 54. In the movement control of the arm base unit 120, for example, the number of rotations of the drive motor 124 is controlled depending on the number of teeth of the gear 152 of the guide unit 126.

The carriage position 6 is a position where the arm 56 of the Rob unit 42 faces the insert port of the drive device 46 that is the carriage destination 14 on a straight line with the cartridge 36 housed in the cell 38 existing therebetween and the cartridge 36 is transferred by the linear movement of the arm 56.

Figure 17:
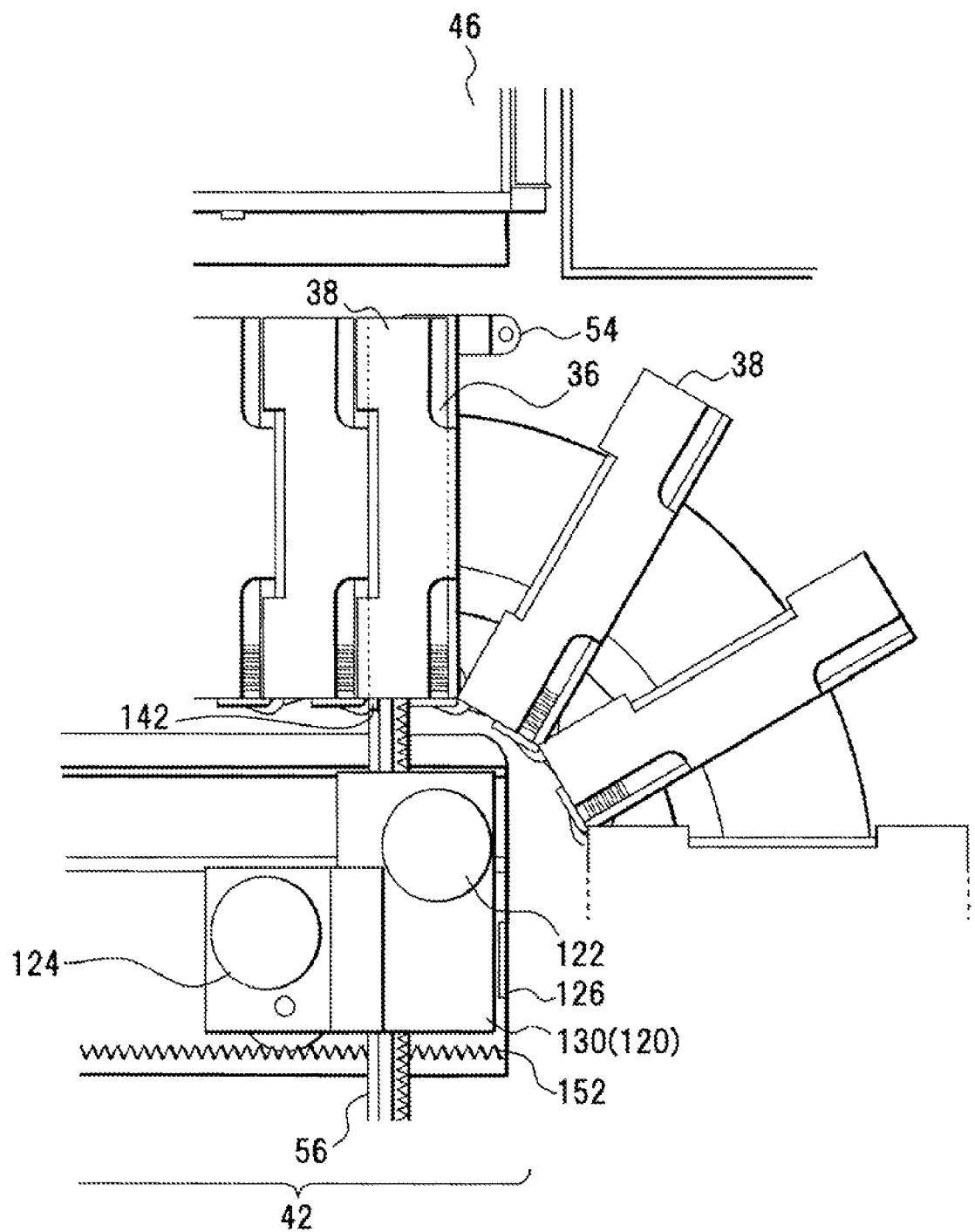
FIG. 17 is a diagram of an example of the stage of the cartridge transfer operation by the Rob unit.

Once the arm base unit 120 moves toward the carriage position 6, the arm 56 is moved toward the cell 38 as depicted in FIG. 17 to bring the claw unit 142 at the leading end of the arm 56 into contact with the housed cartridge 36.

Figure 18:
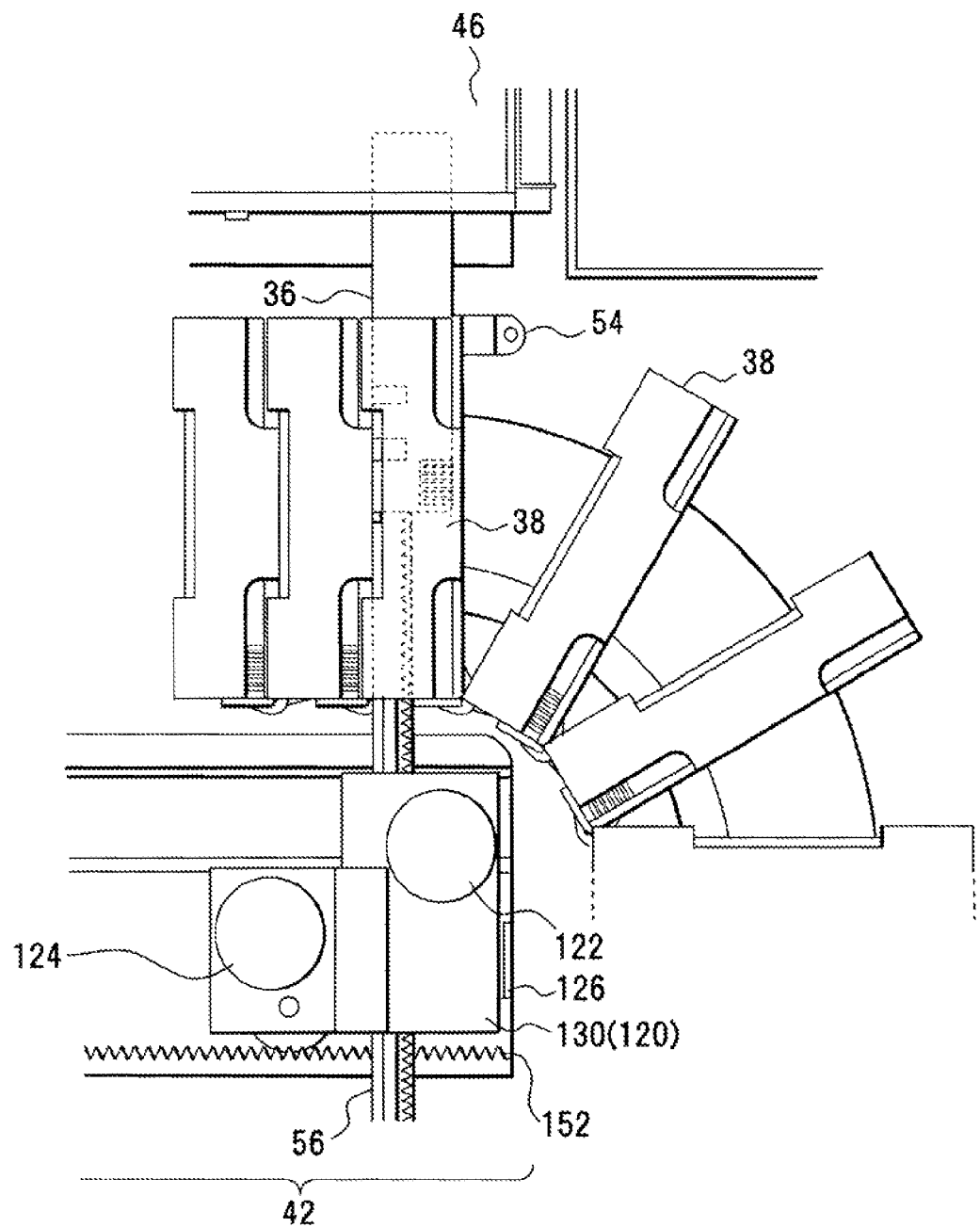
FIG. 18 is a diagram of an example of the stage of the cartridge transfer operation by the Rob unit.

The arm 56 is further moved to push the cartridge 36 housed in the cell 38 toward the drive device 46 (FIG. 18). As depicted in FIG. 19, the arm 56 is moved to a loading point (loading position) causing the drive device 46 to load the cartridge 36.

As depicted in FIG. 20, the arm 56 pushes the lower portion of the cartridge 36 with the claw unit 142 of the arm 56 for the transfer to the predetermined loading point.

Once the cartridge 36 is loaded into the drive device 46, for example, the drive motor 122 is driven in the opposite direction to move the arm 56 toward the Rob unit 42 as depicted in FIG. 21 and the transfer process is terminated.

Figure 27:
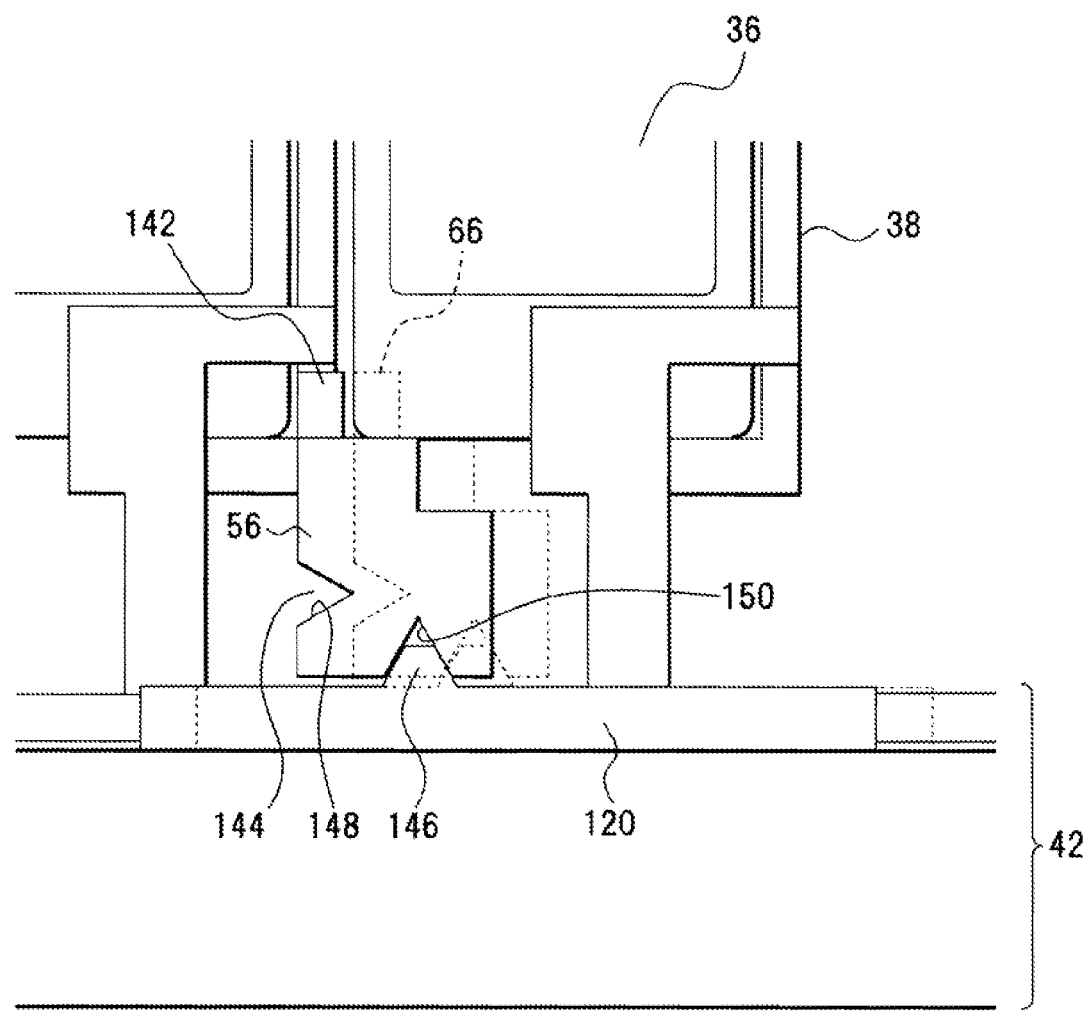
FIG. 27 is a diagram of an example of avoidance movement of the arm.
Figure 28:
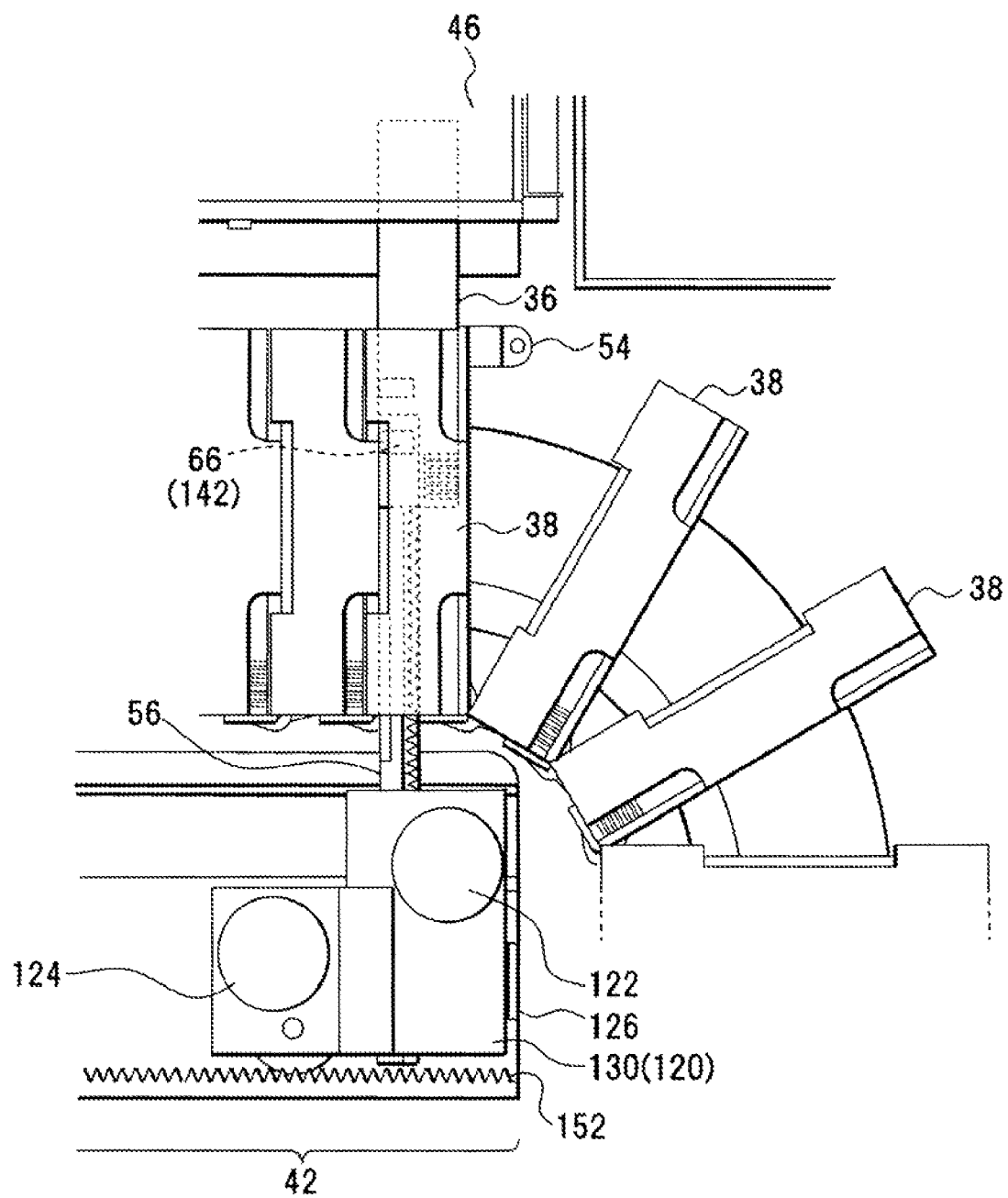
FIG. 28 is a diagram of an example of a cartridge transfer state from the drive device to the cell.
Figure 29:
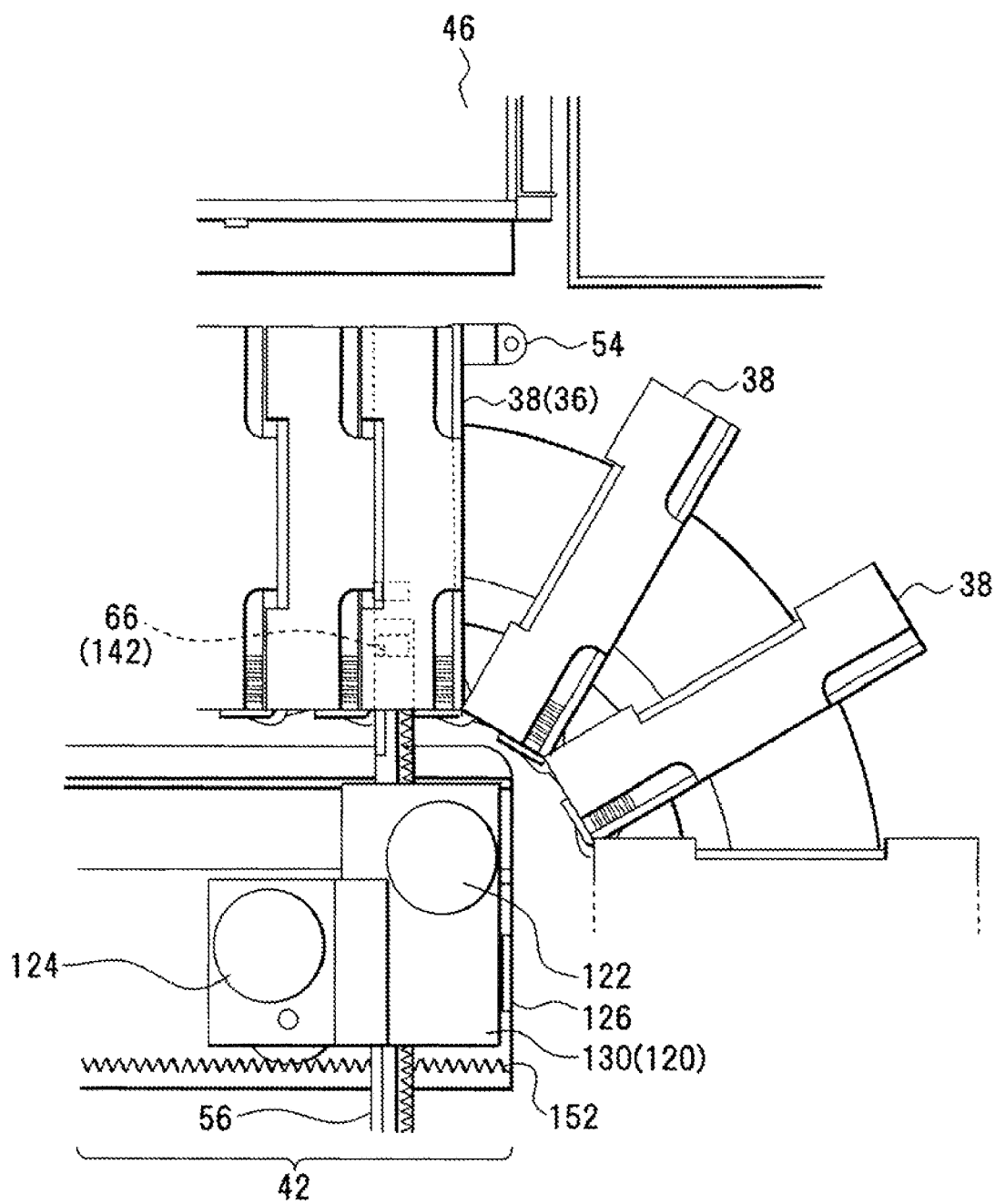
FIG. 29 is a diagram of an example of a state of the cartridge housed in the cell.
Figure 30:
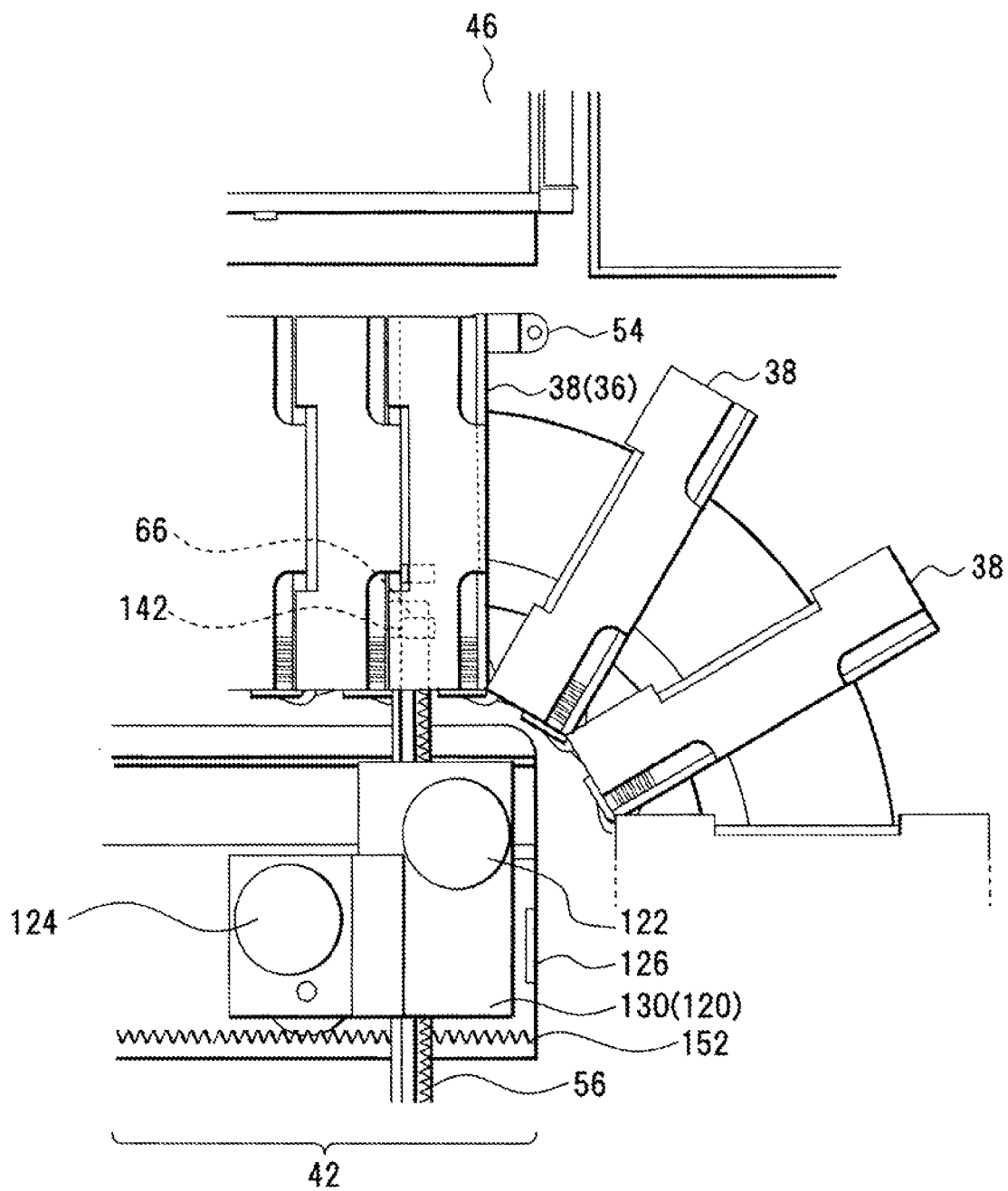
FIG. 30 is a diagram of an example of a state of releasing the arm from the cartridge.
Figure 31:
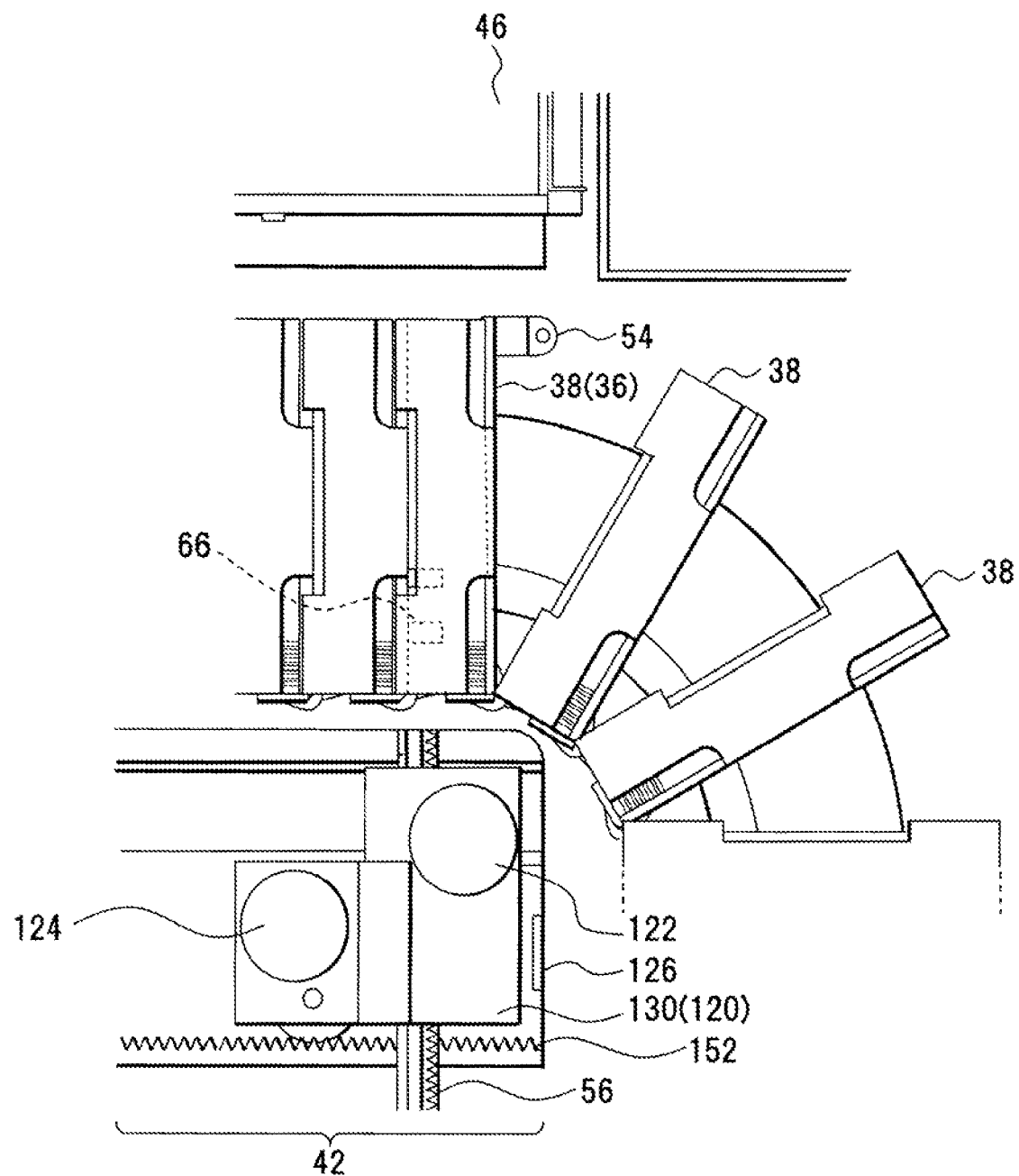
FIG. 31 is a diagram of an example of an arm movement process after the cartridge transfer.

The transfer process from the carriage destination to the housing unit will be described with reference to FIGS. 22 to 31. FIGS. 22 to 26 are diagrams of an example of a stage of the cartridge transfer operation from the drive device to the cell by the Rob unit; FIG. 27 is a diagram of an example of avoidance movement of the arm; FIG. 28 is a diagram of an example of the cartridge transfer state from the drive device to the cell; FIG. 29 is a diagram of an example of a state of the cartridge housed in the cell; FIG. 30 is a diagram of an example of a state of releasing the arm from the cartridge; and FIG. 31 is a diagram of an example of the arm movement process after the cartridge transfer. The operation order, the configurations, etc., depicted in FIGS. 22 to 31 are by way of example and not limitation.

When the cartridge 36 is transferred from the drive device 46 that is the carriage destination 14 to the cell 38 that is the housing unit 8, for example, the claw unit 142 formed on the arm 56 is engaged with the groove 66 (FIG. 6) to pull out the cartridge 36.

Figure 22:
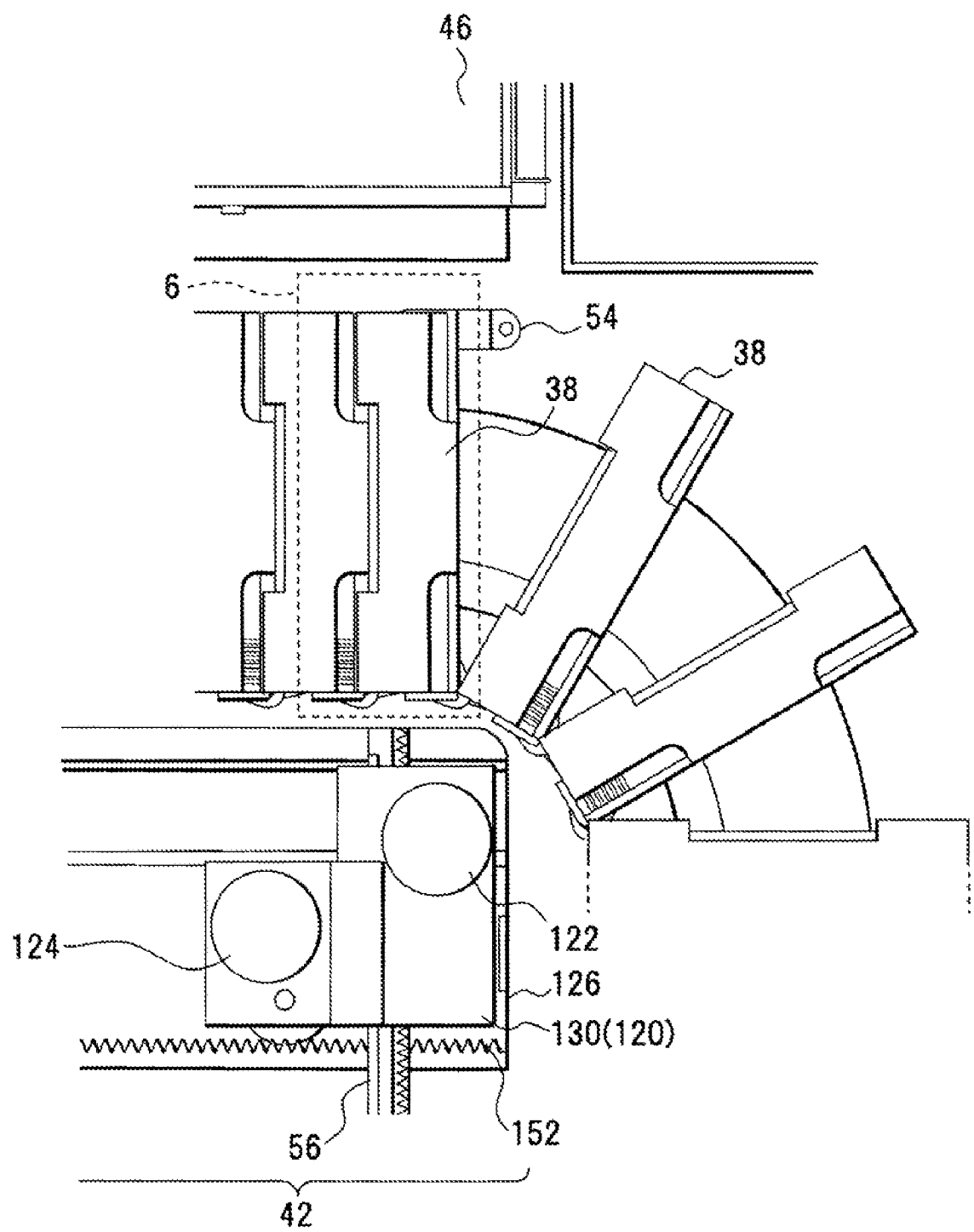
FIG. 22 is a diagram of an example of a stage of a cartridge transfer operation from a drive device to the cell by the Rob unit.

For example, when an ejection instruction for the cartridge 36 is received from the drive device 46, the cell group 40 is rotated to carry the cell 38 without the housed cartridge 36 to the carriage position 6 as depicted in FIG. 22. For this cell 38, for example, the cell 38 may be specified that housed the cartridge 36 inserted into the drive device 46. Alternatively, another empty cell 38 may be utilized that is identified by the bar-code reader 52, etc. In this case, the Rob unit 42 is moved toward the carriage position 6 in accordance with the above ejection instruction.

Figure 23:
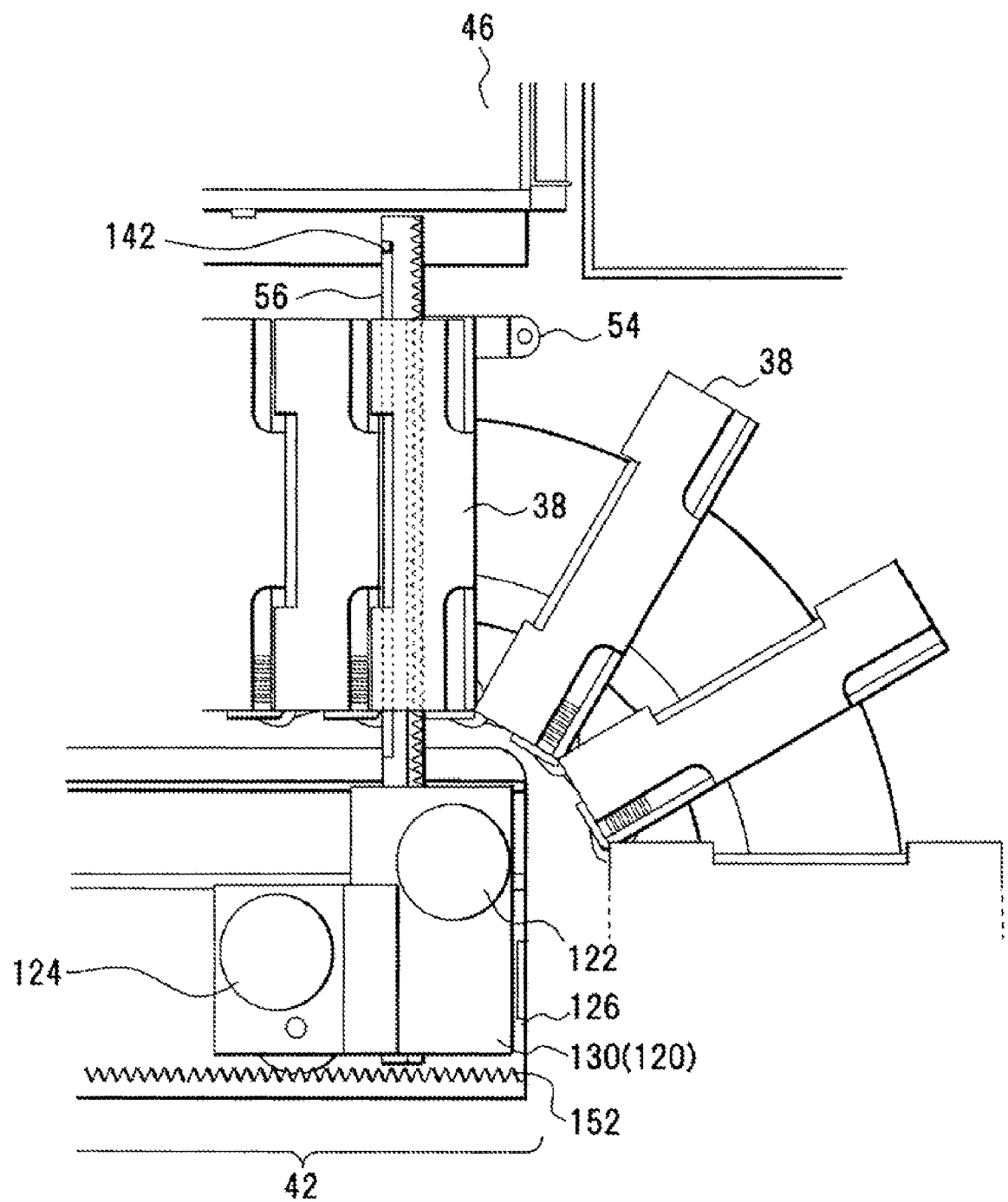
FIG. 23 is a diagram of an example of the stage of the cartridge transfer operation from the drive device to the cell by the Rob unit.

If it is confirmed that the specified cell 38 and the arm base unit 120 of the Rob unit 42 arrive at the carriage position 6, the arm 56 is moved toward the drive device 46 as depicted in FIG. 23. The movement amount of the arm 56 in this case is controlled such that, for example, the claw unit 142 of the arm 56 is adjusted to the ejection position when the drive device 46 ejects the cartridge 36, for example, the position of the groove 66 of the ejected cartridge 36.

Figure 24:
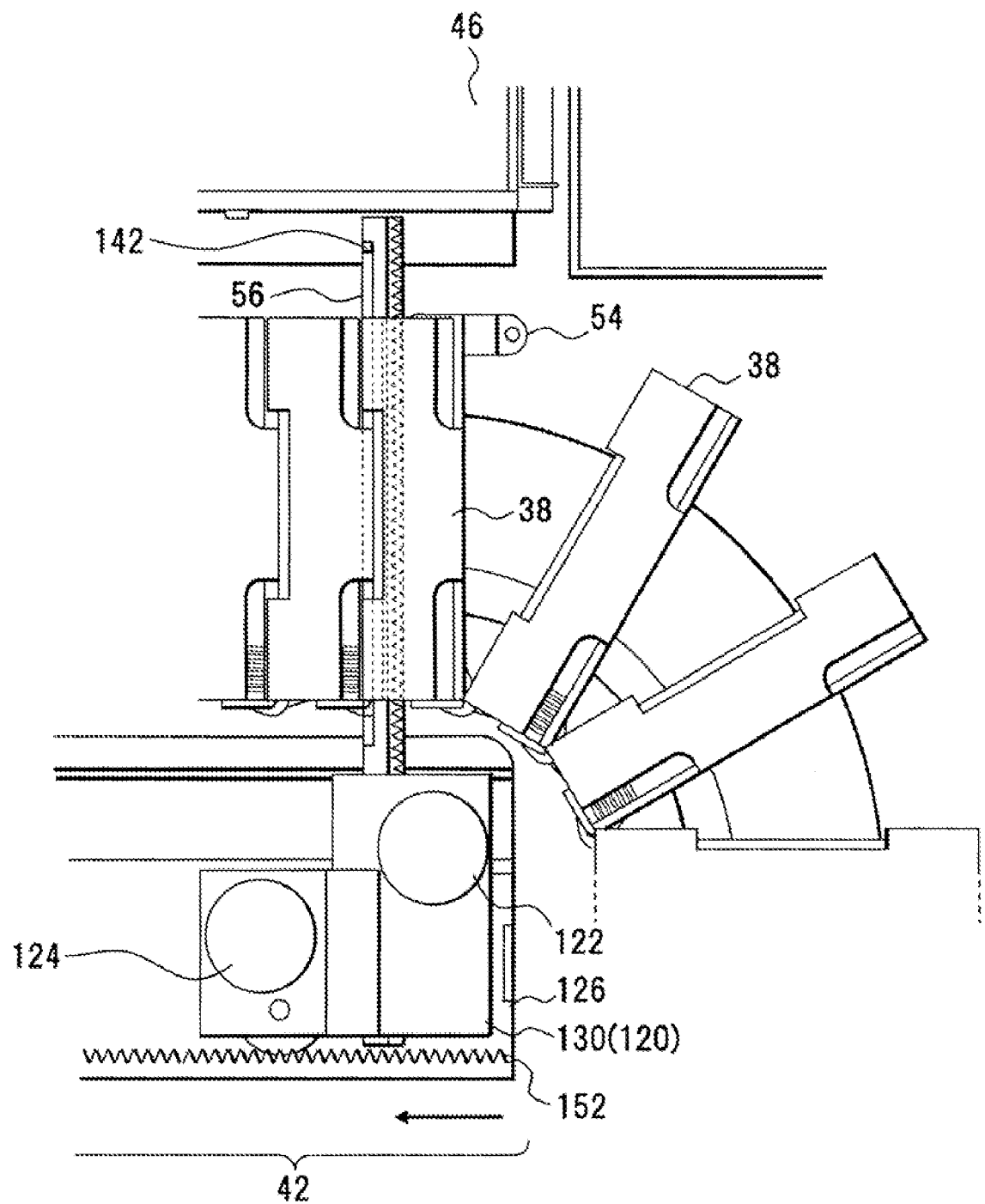
FIG. 24 is a diagram of an example of the stage of the cartridge transfer operation from the drive device to the cell by the Rob unit.
Figure 25:
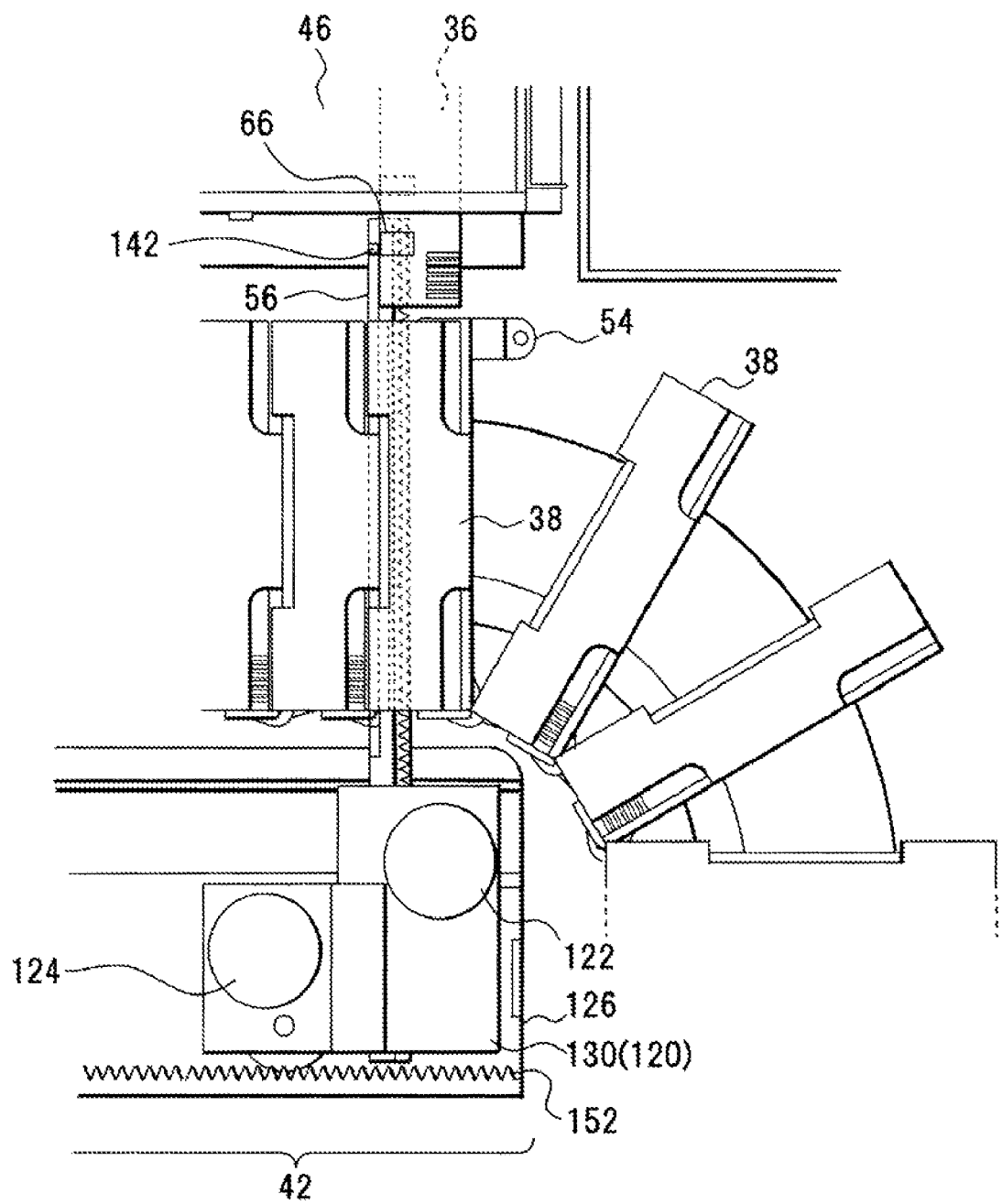
FIG. 25 is a diagram of an example of the stage of the cartridge transfer operation from the drive device to the cell by the Rob unit.

Once the arm 56 is moved in accordance with the ejection point, the arm base unit 120 is moved to the left, for example, as depicted in FIG. 24. The movement amount of the arm base unit 120 in this case is set to one tooth of the gear 152 of the guide unit 126, for example. As depicted in FIG. 25, this movement of the arm base unit 120 is the avoidance movement for preventing the claw unit 142 of the arm 56 from coming into contact with the cartridge 36 ejected from the drive device 46.

Although the avoidance movement control of the arm 56 is performed in this process since the initial position of the arm base unit 120 is set to the carriage position 6 for the drive device 46, this is not limitation and, for example, the position after the avoidance movement may be set as the initial position of the carriage process.

Figure 26:
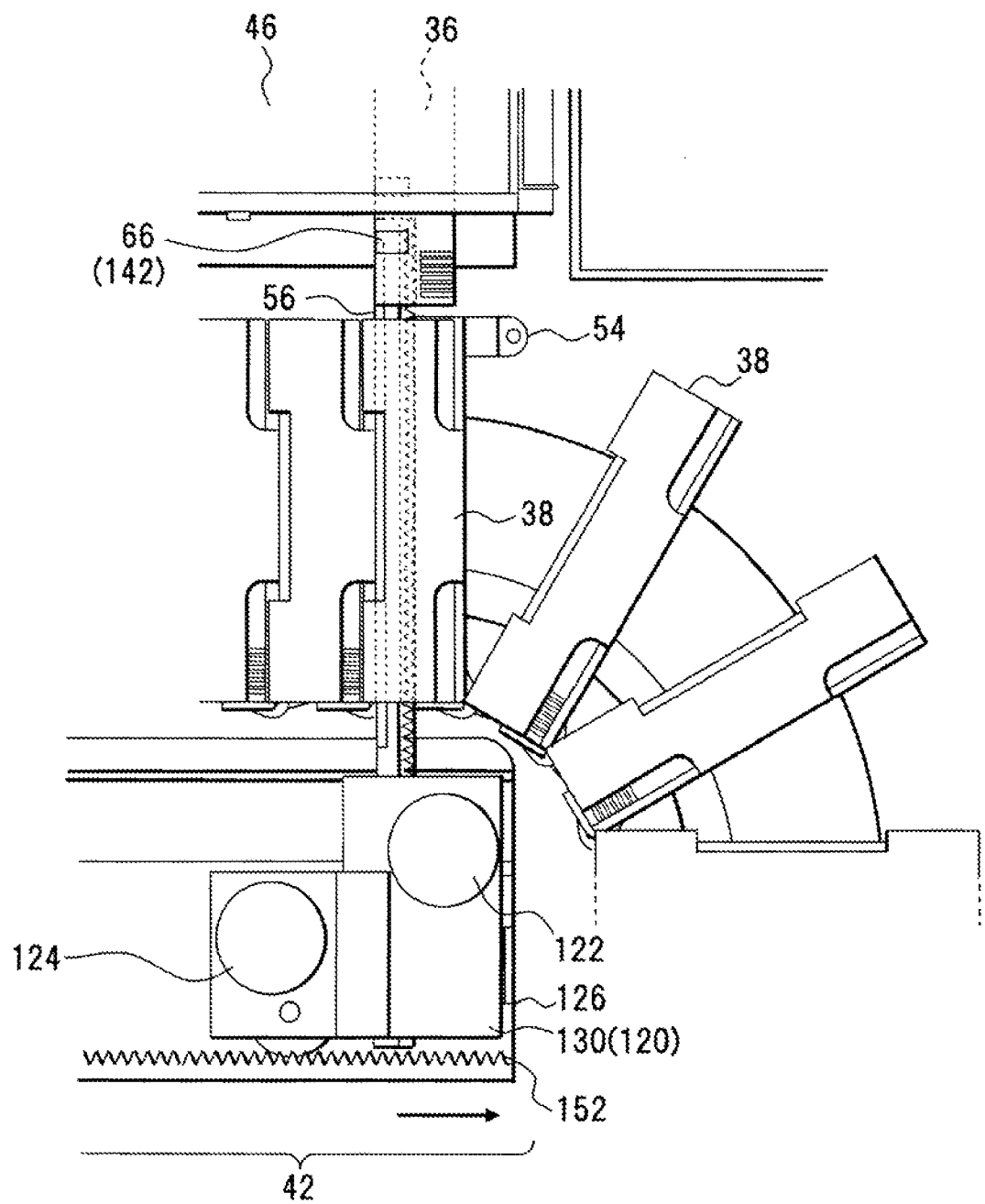
FIG. 26 is a diagram of an example of the stage of the cartridge transfer operation from the drive device to the cell by the Rob unit.

Once the cartridge 36 is ejected from the drive device 46, the arm base unit 120 of the Rob unit 42 is moved to the initial position as depicted in FIG. 26. This causes the claw unit 142 of the art 56 to be inserted into the groove 66 of the cartridge 36. FIG. 27 depicts the state of the avoidance or insertion movement of the claw unit 142 of the arm 56.

By driving the drive motor 122 of the Rob unit 42 to move the arm 56 toward the Rob unit 42, the cartridge 36 is transferred from the drive device 46 toward the cell 38 as depicted in FIG. 28.

Once the arm 56 is moved to the position where the cartridge 36 reaches the end unit 78 (FIG. 9) of the cell 38 (FIG. 29), the arm base unit 120 is caused to perform the avoidance movement again to pull out the claw unit 142 from the groove 66 of the cartridge 36 (FIG. 30) and the arm 56 is moved toward the Rob unit 42 and returned to the initial position (FIG. 31).

With the above movement control, the cartridge 36 is transferred from the drive device 46 to the cell 38. With such a configuration, the cartridge 36 may be transferred to the drive device 46 for the cell group 40 arranged in a ring shape by the Rob unit 42 disposed within the ring thereof. The cartridge 36 may also be transferred from the drive device 46 to the cell 38.

Figure 32:
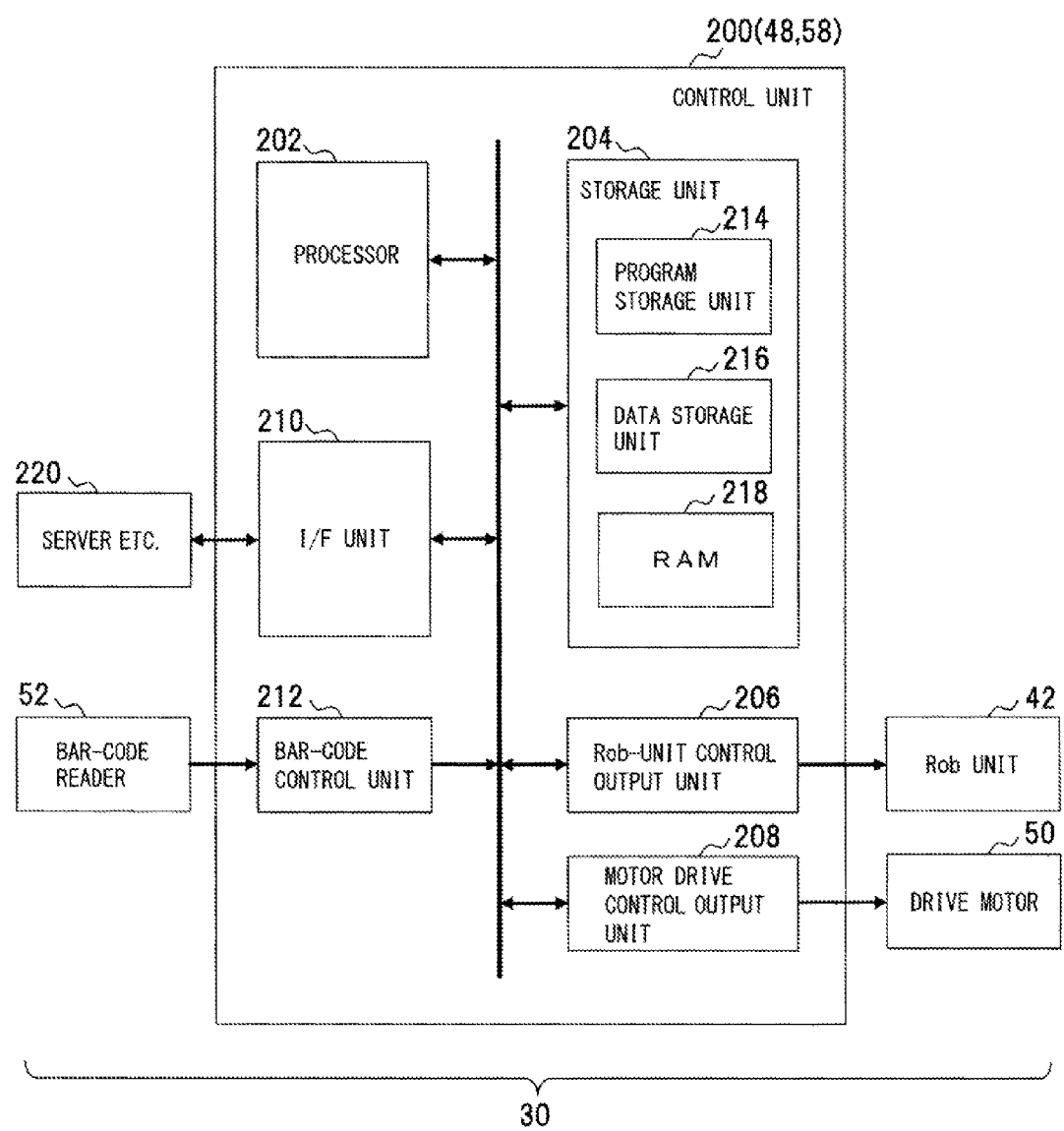
FIG. 32 is a diagram of an exemplary configuration of a control unit of the library apparatus.

A control unit of the library apparatus will be described with reference to FIG. 32. FIG. 32 is a diagram of an exemplary configuration of the control unit of the library apparatus. The configuration depicted in FIG. 32 is by way of example and not limitation.

A control unit 200 of the library apparatus 30 is made up of a computer and is made up of the above control printed boards 58, equipped in the shelf unit 48, for example. The control unit 200 may include a processor 202, a storage unit 204, a Rob-unit control output unit 206, a motor drive control output unit 208, an I/F unit 210, a bar-code control unit 212, etc.

The processor 202 is made up of, for example, a CPU (Central Processing Unit) and is a computing unit that executes OS (Operating System) and, for example, programs of the motor control for rotating the cell group 40 and the operation control of the Rob unit 42 stored in the storage unit 204.

The storage unit 204 is an example of a storage unit that stores data, programs, etc., and is made up of a program storage unit 214, a data storage unit 216, and a RAM (Random-Access Memory) 218, for example. The program storage unit 214 records, for example, the OS causing the library apparatus 30 to function and, for example, a motor control program for rotating the cell group 40, an operation control program for the Rob unit 42, and an identification process program for the cells 38. The data storage unit 216 records, for example, data to be recorded on the magnetic tape of the cartridge 36. The RAM 218 makes up a work area for executing the various programs and the programs are executed to make up execution control units such as a position determination processing unit, a carriage control unit, and a rotation control unit for the cells 38, a taking-out/putting-in control unit for the arm 56, and a movement control unit for the arm base unit 120, for example.

The above processing programs are not limited to those stored in the program storage unit 214, etc., and, for example, those stored in a computer readable recording medium such as a magnetic disc, a flexible disc, an optical disc, and a magnetic optical disc may be utilized. A program on a network may also be read and utilized.

The Rob-unit control output unit 206 is an example of an instruction output unit for the Rob unit 42 and outputs a movement control instruction for the arm base unit 120, a movement control instruction for the arm 56, etc. For example, instructions may be given for the rotation number control of the drive motor 122 that moves the arm 56 and the rotation number control of the drive motor 124 that moves the arm base unit 120.

The motor drive control output unit 208 is an example of an instruction output unit for the drive motor 50 and performs the carriage control of rotating the cell group 40 to position the specified cell 38 or the cartridge 36 at the predetermined carriage position 6. For example, a rotation number control instruction for the drive motor 50 is output based on the movement amount of the specified cell 38 or the cartridge 36.

The I/F unit 210 is an example of a connecting unit for a server, etc., 220 connected externally and gives/receives data, etc., to be written on or read from the cartridge 36, for example. The library apparatus 30 and the server, etc., 220 are connected through FC (Fiber Channel), for example.

The bar-code control unit 212 is an example of a position monitoring unit that monitors the cartridges 36 or the cells 38 that are the housed objects 4 and acquires ID, etc., of the cartridges 36 from the bar-code reader 52 to comprehend the position and the housing order of the cartridges 36 housed in the cell group 40 and the empty cells 38, for example. In the carriage process, the bar-code control unit 212 provides the position information of the specified cartridge 36, etc. In the position monitoring of the cells 38 by the bar-code control unit 212, for example, the bar-code labels affixed to the cells 38 may be utilized as above.

Figure 33:
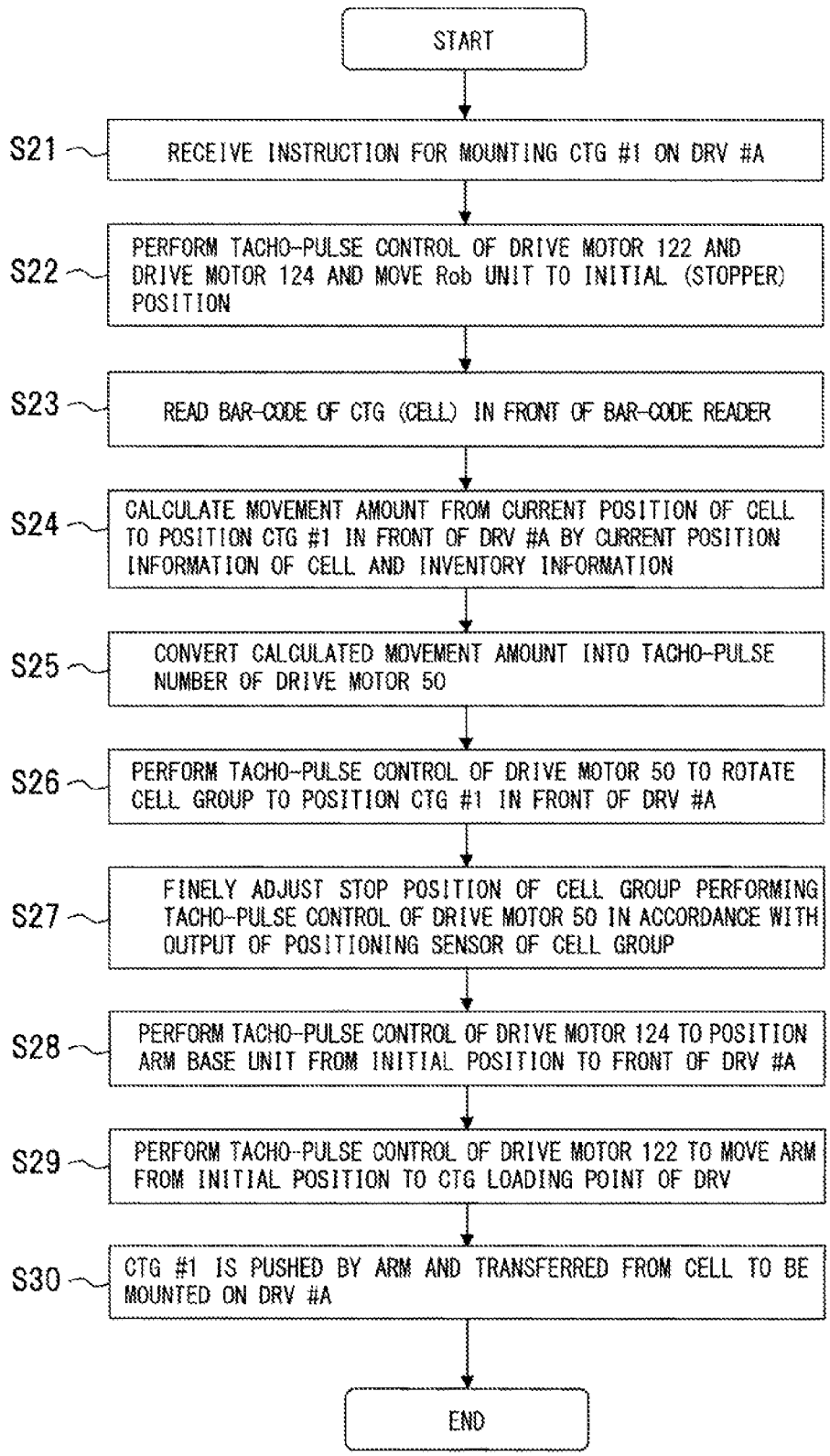
FIG. 33 is a flowchart of a process of mounting the cartridge on the drive device.
Figure 34:
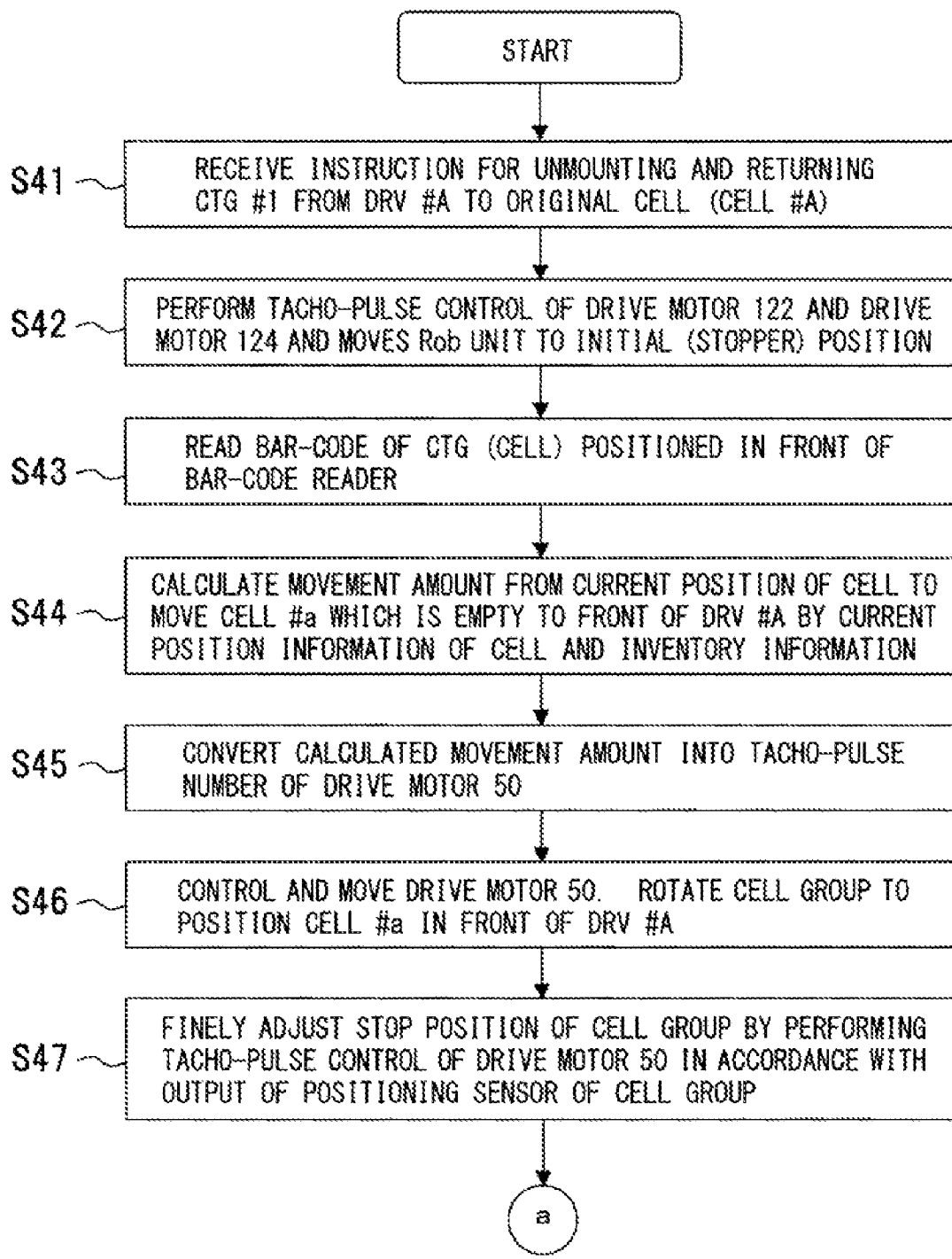
FIG. 34 is a flowchart of a process of ejecting the cartridge from the drive device.
Figure 35:
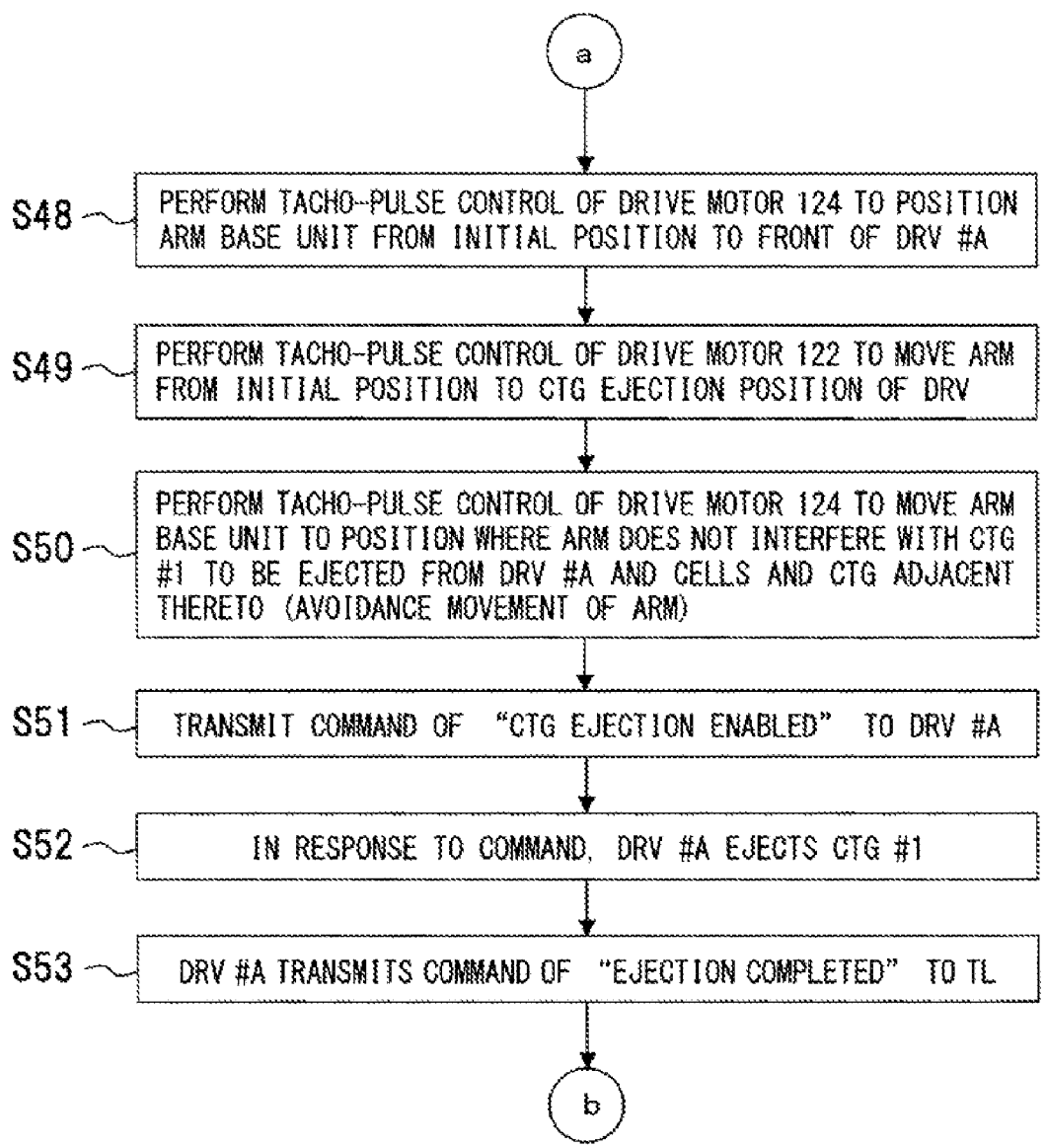
FIG. 35 is a flowchart of a process of ejecting the cartridge from the drive device.
Figure 36:
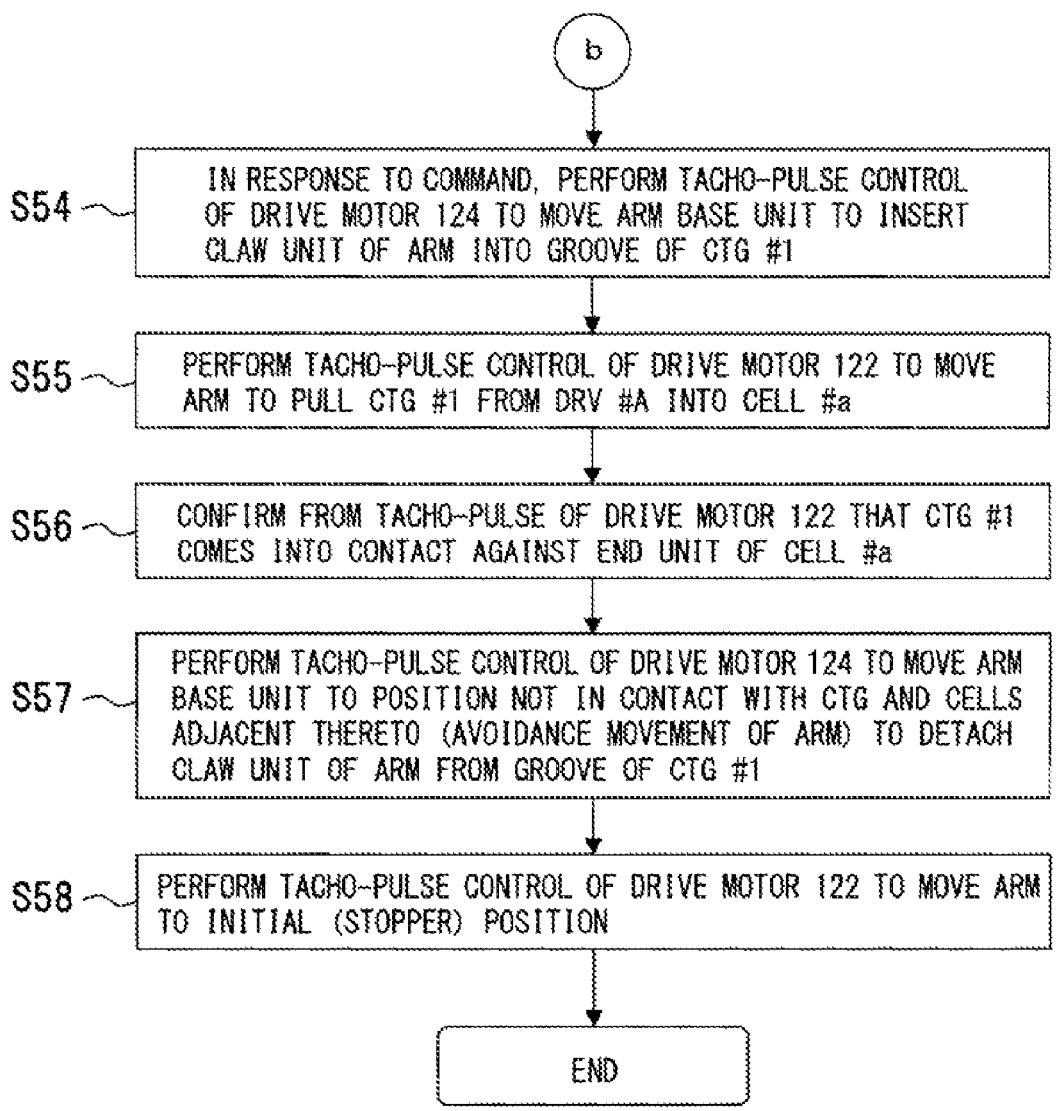
FIG. 36 is a flowchart of a process of ejecting the cartridge from the drive device.

The carriage process of the housing apparatus, the housing method, and the library apparatus will be described with reference to FIGS. 33, 34, 35, and 36. FIG. 33 is a flowchart of a process of mounting the cartridge on the drive device and FIGS. 34, 35, and 36 are flowcharts of a process of ejecting the cartridge from the drive device. The process procedures and the process details depicted in FIGS. 33, 34, 35, and 36 are by way of example and not limitation. In FIGS. 34, 35, and 36, a and b denote connectors between the flowcharts.

In this carriage process, for example, in response to a request from the server, etc., 220 for writing or reading data on/from the specified cartridge 36, the cell group 40 is rotated to carry the cartridge 36 to the predetermined carriage position 6. In accordance with the carriage process of the cell 38 to the carriage position 6, the Rob unit 42 is operated to transfer and mount the cartridge 36 on the specified drive device 46. When the process in the drive device 46 is terminated, the unmounted cartridge 36 is returned to the predetermined cell 38. An example of this carriage process will be described.

In the carriage process of the cartridge 36 to the drive device 46, for example, an instruction is received from the server, etc., 220 for mounting a certain cartridge (CTG) #1 on a specified drive device (DRV) #A as depicted in FIG. 33 (step S21). The library apparatus 30 performs the tacho-pulse (rotation number) control of the drive motor 122 and the drive motor 124 and moves the Rob unit 42 to the initial position (stopper position) to prepare the Rob unit 42 for the carriage (step S22).

The bar-code label 64 of the cartridge 36 or the cell 38 in front of the bar-code reader 52 is read as a process of comprehending the current position of the cell 38 (step S23). The library apparatus 30 refers to the current position information of the cell 38 and inventory information related to the housing state of the cartridges 36 acquired in initial operation, for example. A movement amount from the current position of the cell 38 is calculated to position the cartridge #1 in front of the drive device #A (step S24).

The calculated movement amount is converted into the tacho-pulse number of the drive motor 50 that rotates the cell group 40 (step S25). The tacho-pulse control of the drive motor 50 is performed to rotate the cell group 40 to position the cartridge #1 in front of the drive device #A (step S26). The position correction process for the carriage position 6 of the cell group 40 is performed at this timing, for example, by performing the tacho-pulse control of the drive motor 50 in accordance with the output of the positioning sensor 54 to finely adjust the stop position of the cell group 40 (step S27).

A shift is then made to the transfer process from the cell 38 (the housing unit 8) to the drive device 46 (the carriage destination 14). The tacho-pulse control of the drive motor 124 is performed to position the arm base unit 120 from the initial position to the front of the drive device #A (step S28). The tacho-pulse control of the drive motor 122 is performed to move the arm 56 from the initial position to the loading point of the drive device 46 (step S29). As a result, the cartridge #1 is pushed by the arm 56 and transferred from the cell 38 to be mounted on the drive device #A (step S30).

An example of a process in the case of ejecting the cartridge 36 from the drive device 46 will be described with reference to FIGS. 34, 35, and 36.

In the carriage process of the cartridge 36 from the drive device 46 to the cell 38, an instruction is received for unmounting and returning, for example, the cartridge (CTG) #1 from the drive device (DRV) #A to, for example, an original cell (cell #a) (step S41). As a result, the library apparatus 30 performs the tacho-pulse control of the drive motor 122 and the drive motor 124 and moves the Rob unit 42 to the initial position (stopper position) (step S42).

The bar-code label 64 of the cartridge 36 or the cell 38 in front of the bar-code reader 52 is read to comprehend the position of the cell #a specified to house the cartridge #1 (step S43). A movement amount from the current position of the cell 38 is calculated to move the cell #a in the empty state to the front of the drive device #A by reference to the read current position information of the cell 38 and the inventory information (step S44).

The calculated movement amount is converted into the tacho-pulse number of the drive motor 50 (step S45) and the drive motor 50 is controlled to rotate the cell group 40 to carry and position the cell #a in front of the drive device #A that is the carriage position 6 (step S46). The stop position correction of the cell group 40 is performed in the library apparatus 30 at this timing by performing the tacho-pulse control of the drive motor 50 in accordance with the output of the positioning sensor 54 to finely adjust the stop position of the cell group 40 (step S47).

The library apparatus 30 performs the tacho-pulse control of the drive motor 124 to position the arm base unit 120 from the initial position to the front of the drive device #A (step S48). The tacho-pulse control of the drive motor 122 is performed to move the arm 56 from the initial position to the cartridge ejection position (ejection point) of the drive device 46 (step S49). The avoidance movement is performed for the arm 56 arriving at the ejection position. That is, the tacho-pulse control of the drive motor 124 is performed to move the arm base unit 120 to a position where the arm 56 does not interfere with the cartridge #1 to be ejected from the drive device #A and the cells 38 and the cartridges 36 adjacent thereto (step S50) (FIGS. 25 and 27).

When the preparation for retrieval of the cartridge 36 is completed in the Rob unit 42, the library apparatus 30 transmits a command of "cartridge ejection enabled" to the drive device #A (step S51). In response to this command, the drive device #A ejects the cartridge #1 (step S52) and transmits a command of "ejection completed" to the library apparatus (TL: tape library) 30 (step S53).

Once the ejection process of the drive device 46 is completed, a shift is made to the transfer process to the cell 38 by the Rob unit 42. In response to the command of "ejection completed", the library apparatus 30 performs the tacho-pulse control of the drive motor 124 to move the arm base unit 120 to insert the claw unit 142 of the arm 56 into the groove 66 of the cartridge #1 (step S54). The tacho-pulse control of the drive monitor 122 is performed to move the arm 56 to pull the cartridge #1 from the drive device #A into the cell #a (step S55).

In the transfer of the cartridge 36, the library apparatus 30 confirms from the tacho-pulse controlling the drive motor 122 that the cartridge #1 comes into contact against the end unit 78 of the cell #a (step S56). Once the end unit 78 of the cell #a is reached, the arm 56 is detached from the cartridge #1. That is, the library apparatus 30 performs the tacho-pulse control of the drive motor 124 to move the arm base unit 120 to a position not in contact with the cartridges 36 and the cells 38 adjacent thereto (avoidance movement of the arm) to detach the claw unit 142 of the arm 56 from the groove 66 of the cartridge #1 (step S57).

Once the arm 56 is detached from the cartridge #1, the tacho-pulse control of the drive motor 122 is performed to move the arm 56 to the initial position (stopper position) (step S58) and the carriage process is terminated.

With such a configuration of carrying the cartridge housed in the cell to the carriage position with the drive device, etc., located and sliding and transferring the cartridge with the backward and forward movement of the arm, the operational systems of the Rob unit may be reduced to a simplified configuration. Since the housing cell is rotated and carried to the carriage position in a limited housing space, a waste space inaccessible to the Rob unit that is the carrying unit may be reduced. Since this enables the increased number of housed cartridges even if the cartridges are longitudinally placed, the housing efficiency may be increased. Since the Rob unit is disposed within the ring of the cell group in the rotating cell group arranged in a ring shape, the operation space of the robot may be cut out and the library apparatus may be prevented from increasing in size even if many cartridges are longitudinally placed to be housed.

The features, advantages, or variations of the first and second embodiments will be listed as follows.

(1) The library apparatus is a rack-mount type and has a structure of moving (rotating) the cells 38 with the cartridges longitudinally placed to reduce motors of the carrying Rob unit while the housing efficiency of the cartridges 36 is enhanced.

(2) In the drive device, head contamination may occur depending on operational conditions, causing a reading/writing error disabling reading or writing. Therefore, it is better that the device replacement is easily performed. In this regard, the functional units such as the drive device 46 are arranged on the rear side of the rotating cell group 40 in the above configuration to achieve the arrangement configuration making replacement easier.

(3) The bar-code reader 52, the Rob unit 42, etc., are arranged for a plurality of the housing units arranged in a ring shape (the cell group 40) within the ring of the cell group 40. Therefore, the library apparatus 30 manages the current positions of the cartridges 36 by reading ID printed on the bar-code labels 64 affixed to the cartridges 36 with the bar-code reader 52.

(4) Since credibility is important in the library apparatus due to the purpose thereof, an expensive motor with high credibility and longer life is used for the motor of the Rob unit. Therefore, a multiplicity of motors are needed for a conventional multi-system operational Rob unit, resulting in high cost as well as a poor failure rate in the aspect of credibility. On the other hand, the above configuration combines the carriage of the housed cartridge 36 by the cell 38 with the translation by the arm base unit 120 and the backward and forward movement of the arm 56 to enable the cartridge 36 to be carried to the drive device 46 that is the carriage destination 14, the Rob unit 42 may simply be structured as a whole and the motors may be reduced.

(5) To make the cells rotatable, the cells 38 are provided with the gear unit 88 and are configured to be coupled with each other by the pins (82 and 84).

(6) The cartridge 36 is a tape medium wound on a reel and damage may occur at the edge of a tape due to occurrence of staggering-wrapping (wrapping slippage). However, the occurrence of stagger-wrap may be reduced by longitudinally placing the cartridge 36. Therefore, the library apparatus 30 is capable of preventing damage to the cartridges 36 by longitudinally placing and arranging the cartridges 36 to rotate the cell group 40.

(7) A conventional library apparatus has an arrangement configuration in a housing with the cartridges stacked in one or a plurality of steps in the height direction and arranged to face each other on the left and right sides of the apparatus. Therefore, the operational systems of the Rob unit taking out the housed cartridge and housing the cartridge require a drive motor for each of the operational systems of the height direction or the left/right direction of the apparatus, the depth direction of the apparatus, and the rotation direction as well as the opening and closing operation of the claw unit of the Rob unit and the backward and forward operation of the claw unit, for example. On the other hand, the above configuration has the drive device 46 disposed on the rear side of the rotating cell group 40 and is capable of performing the transfer of the cartridge 36 from the cell 38 to the drive device 46 or from the drive device 46 to the cell 38 with the translation of the arm base unit 120 and the two-axis (backward and forward) operation of the arm 56.

(8) A plurality of the cells 38 housing the cartridges 36 may be arranged in the housing of the library apparatus 30 in a circulating manner along the side walls thereof to house the cartridges 36 of the corresponding number to the size of the apparatus and the housing efficiency may be increased.

Third Embodiment

Figure 37:
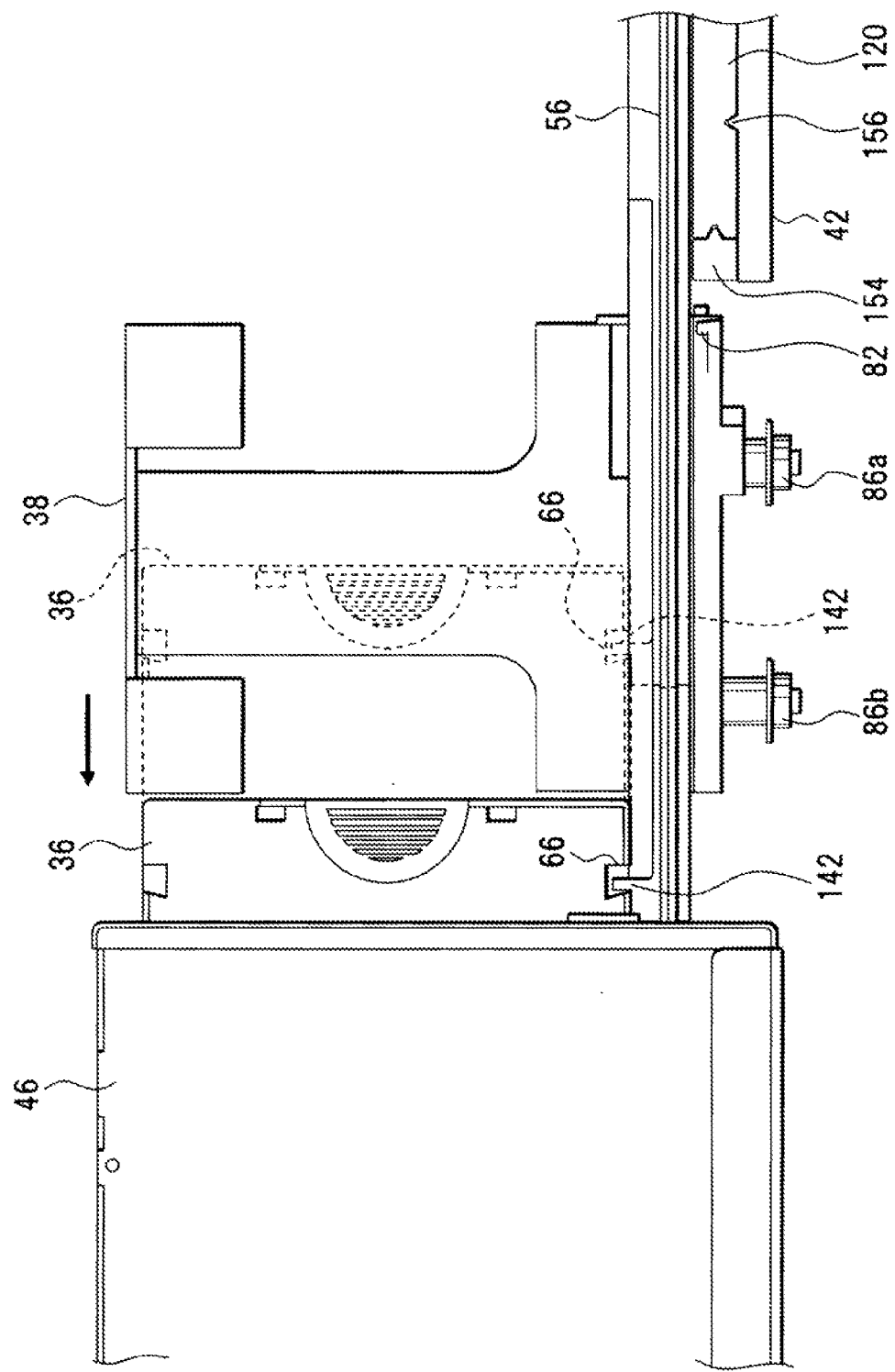
FIG. 37 is a diagram of an example of a cartridge transfer process to the drive device according to a third embodiment.

A third embodiment will be described with reference to FIG. 37. FIG. 37 is a diagram of an example of a cartridge carriage process to the drive device according to the third embodiment. The configuration depicted in FIG. 37 is by way of example and not limitation. In FIG. 37, the same constituent elements as FIG. 20 are denoted by the same reference numerals.

In this carriage process, a variation of the carriage state of the Rob unit 42 will be described in association with the carriage of the cartridge 36 from the cell 38 to the drive device 46.

In the transfer of the cartridge 36 from the cell 38 to the drive device 46, the clay unit 142 pushes the cartridge through the movement of the arm 56 of the Rob unit 42 as depicted in FIG. 20 in the above embodiments. On the other hand, as depicted in FIG. 37, the cartridge 36 may be transferred with the claw unit 142 of the arm 56 inserted into the groove 66 of the cartridge 36.

In this case, for example, the avoidance movement of the arm 56 depicted in FIG. 27 at the time of movement of the arm 56 to the cell 38 (FIG. 17) and at the time of carriage to the loading point of the drive device 42 (FIG. 19) may be performed in the carriage process of the cartridge 36.

With such a configuration, the same effects as the above embodiments may be acquired. The operation control may be performed in the same process procedures for the Rob unit in the transfer of the cartridge to the drive device and the transfer from the drive device to the cell, enabling the simple control process.

Other Embodiments (1) Although the cartridge 36 containing the magnetic tape as a recording medium is exemplarily illustrated as the housed object housed in the library apparatus 30 in the above embodiments, this is not limitation. For example, hard disc drive (HDD), CD (Compact disc), etc., may be housed and carried as the recording medium.

Figure 38:
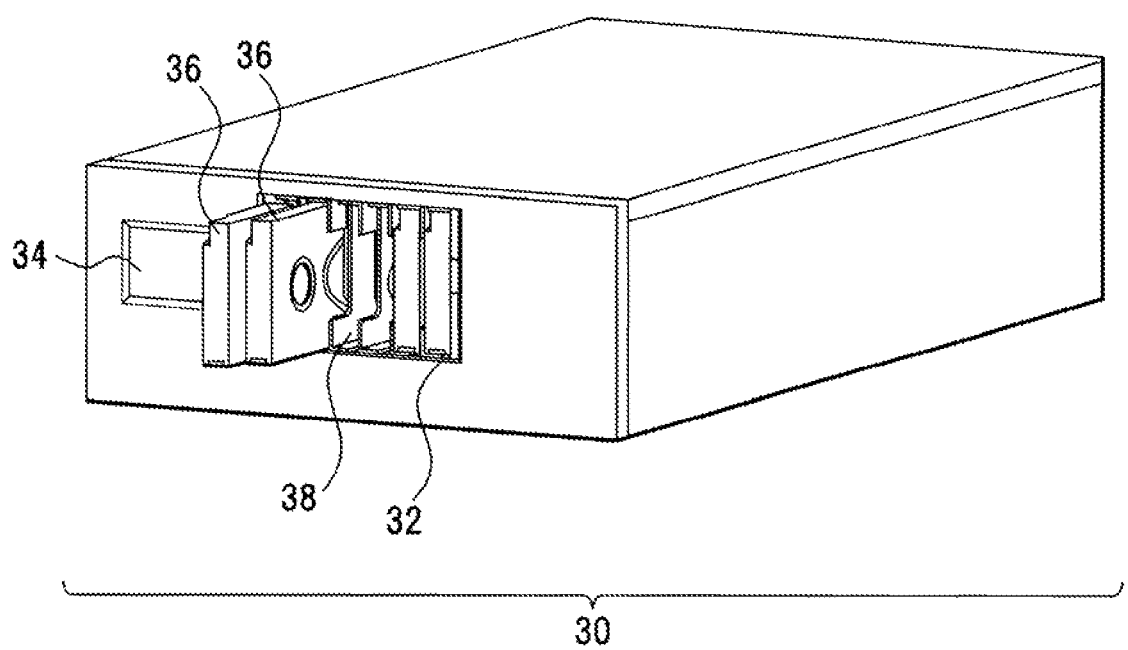
FIG. 38 is a diagram of an example of a cartridge carriage process by the cell group according to another embodiment.

(2) In the library apparatus 30, the carriage process of the rotating cell group 40 is not limited to the carriage process to the drive device 46 and may be performed for the inserting/ejecting process of the cartridge 36 for the library process 30, for example. That is, as depicted in FIG. 38, a position on the side of the window 32 of the library apparatus 30 is set as the carriage position 6 and the predetermined cell 38 is rotated and carried to insert or eject the cartridge 36. This carriage process may be triggered, for example, by an input instruction to the operation panel 34 of the library apparatus 30 to carry the predetermined cell 38 toward the window 32. With such a configuration, the same effects as the above embodiments may be acquired and, for example, it is not needed to use a cartridge inserting/ejecting unit such as CAS (Cartridge Access Station) and a magazine.

(3) Although the above embodiments are exemplarily illustrated as the case of the library apparatus 30 having a predetermined value of the size in the height direction (e.g., 4U size) and the cartridges 36 longitudinally placed in a single step, this is not limitation and, for example, the cell groups 40 may be stacked in a plurality of steps in accordance with the height of the library apparatus 30. In this case, the Rob unit 42 acting as the transferring unit 12 may be configured to be moved up and down or the Rob unit 42 may be provided in each step.

Technical ideas extracted from the embodiments of the present invention described above will then be listed. The technical ideas according to the present invention may be comprehended at various levels and variations ranging from higher to lower conceptions and the present invention is not limited to the following description.

A housing apparatus includes a plurality of housing units to have housed objects housed therein, a carrying unit to include the plurality of the housing units arranged in a ring shape, the carrying unit carrying the housing units to a carriage position, and a transferring unit to be disposed facing a carriage destination of the housed objects with the carrying unit existing therebetween to transfer the housed object in the housing unit carried and positioned at the carriage position from the housing unit to the carriage destination or to transfer the housed object in the carriage destination from the carriage destination to the housing unit.

The above housing apparatus may further include an identifying unit to identify and specify the housed objects housed in the housing units, and a carriage control unit to control carriage by the carrying unit, wherein the carriage control unit controls to carry to the carriage position the housing unit housing the housed object specified based on identification information of the housed objects.

In the above housing apparatus, the carrying unit may include a rotating mechanism that rotates the plurality of the housing units arranged in a ring shape.

In the above housing apparatus, the transferring unit may be disposed within a ring of the plurality of the housing units arranged in a ring shape to include a taking-out/putting-in mechanism that pulls out or pushes in the housed object between the housing unit and the carriage destination.

In the above housing apparatus, the carriage control unit may calculate a carriage amount of the housing unit housing the housed object specified based on the identification information to the carriage position.

A housing method includes carrying a plurality of housing units having housed objects housed therein to a carriage position, the housing units being arranged in a ring shape, and transferring the housed object in the housing unit carried and positioned at the carriage position from the housing unit to a carriage destination or transferring the housed object in the carriage destination from the carriage destination to the housing unit.

The above housing method may further include identifying and specifying the housed objects housed in the housing units, and carrying to the carriage position the housing unit housing the housed object specified based on identification information of the housed objects.

The above housing method may further include rotating the plurality of the housing units arranged in a ring shape.

The above housing method may further include pushing in or pulling out the housed object between the housing unit and the carriage destination.

The above housing method may further include calculating a carriage amount of the housing unit housing the housed object specified based on the identification information to the carriage position.

A library apparatus to store a plurality of recording mediums and have a carrying function for the recording mediums includes a plurality of housing units to have recording mediums housed therein, a carrying unit to include the plurality of the housing units arranged in a ring shape, the carrying unit carrying the housing units to a carriage position, and a transferring unit to be disposed facing a carriage destination of the recording mediums with the carrying unit existing therebetween to transfer the recording medium in the housing unit carried and positioned at the carriage position from the housing unit to the carriage destination or to transfer the recording medium in the carriage destination from the carriage destination to the housing unit.

The above library apparatus may further include an identifying unit to identify and specify the recording mediums housed in the housing units, and a carriage control unit to control carriage by the carrying unit, wherein the carriage control unit controls to carry to the carriage position the housing unit housing the recording medium specified based on identification information of the recording mediums.

In the above library apparatus, the carrying unit may include a rotating mechanism that rotates the plurality of the housing units arranged in a ring shape.

In the above library apparatus, the transferring unit may be disposed within a ring of the plurality of the housing units arranged in a ring shape to include a taking-out/putting-in mechanism that pulls out or pushes in the recording medium between the housing unit and the carriage destination.

In the above library apparatus, the carriage control unit may calculate a carriage amount of the housing unit housing the recording medium specified based on the identification information to the carriage position.

According to the housing apparatus, the housing method, or the library apparatus of the disclosure, the following effects may be acquired.

(1) Since a plurality of the housing units housing the housed objects are carried and positioned at a predetermined carriage position by the housing unit group arranged in a ring shape, the operational systems of the carriage unit may be reduced to simplify the carrying apparatus.

(2) The configuration of carrying and positioning the housed object at a predetermined carriage position by the housing unit group generates no waste space making the housed objects housed in the housing apparatus inaccessible to the carrying unit and the housing efficiency of the housed objects may be increased.

Although the embodiments of the housing apparatus, the housing method, or the library apparatus have been described as above, the present invention is not limited to the above description and may variously be modified or altered by those skilled in the art based on the spirit of the present invention described in claims or disclosed in the description of embodiments of course and it is needless to say that such modifications and alterations fall within the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A housing apparatus comprising:
a housing chain that includes a plurality of housing units, the housing units housing housed objects, the housing units being arranged in a ring shape, adjacent housing units of the housing units being coupled rotatably;
a carrying unit to rotate the housing chain, the carrying unit carrying the housing units to a carriage position; and
a transferring unit to be disposed facing a carriage destination of the housed objects with the carrying unit existing therebetween to transfer the housed object in the housing unit carried and positioned at the carriage position from the housing unit to the carriage destination or to transfer the housed object in the carriage destination from the carriage destination to the housing unit,
wherein a pin provided for one housing unit of the adjacent housing units is engaged with a coupling hole, the coupling hole being provided for another housing unit of the adjacent housing units, the coupling hole being for insertion of the pin, and
the housing chain is formed by coupling the housing units with each other so that coupled sides of the housing units are arranged in an inside of a ring shape.

2. The housing apparatus of claim 1, further comprising:
an identifying unit to identify and specify the housed objects housed in the housing units; and
a carriage control unit to control carriage by the carrying unit, wherein
the carriage control unit controls to carry to the carriage position the housing unit housing the housed object specified based on identification information of the housed objects.

3. The housing apparatus of claim 2, wherein the carriage control unit calculates a carriage amount of the housing unit housing the housed object specified based on the identification information to the carriage position.

4. The housing apparatus of claim 1, wherein the carrying unit includes a rotating mechanism that rotates the plurality of the housing units arranged in a ring shape.

5. The housing apparatus of claim 1, wherein the transferring unit is disposed within a ring of the plurality of the housing units arranged in a ring shape to include a taking-out/putting-in mechanism that pulls out or pushes in the housed object between the housing unit and the carriage destination.

6. A housing method comprising:
rotating a housing chain that includes a plurality of housing units, and carrying the housing units to a carriage position, the housing units housing housed objects, the housing units being arranged in a ring shape, adjacent housing units of the housing units being coupled rotatably; and
transferring the housed object in the housing unit carried and positioned at the carriage position from the housing unit to a carriage destination or transferring the housed object in the carriage destination from the carriage destination to the housing unit,
wherein a pin provided for one housing unit of the adjacent housing units is engaged with a coupling hole, the coupling hole being provided for another housing unit of the adjacent housing units, the coupling hole being for insertion of the pin, and
the housing chain is formed by coupling the housing units with each other so that coupled sides of the housing units are arranged in an inside of a ring shape.

7. The housing method of claim 6, further comprising:
identifying and specifying the housed objects housed in the housing units; and
carrying to the carriage position the housing unit housing the housed object specified based on identification information of the housed objects.

8. The housing method of claim 7, further comprising calculating a carriage amount of the housing unit housing the housed object specified based on the identification information to the carriage position.

9. The housing method of claim 6, further comprising rotating the plurality of the housing units arranged in a ring shape.

10. The housing method of claim 6, further comprising pushing in or pulling out the housed object between the housing unit and the carriage destination.

11. A library apparatus to store a plurality of recording mediums and have a carrying function for the recording mediums, comprising:
a housing chain that includes a plurality of housing units, the housing units housing recording mediums, the housing units being arranged in a ring shape, adjacent housing units of the housing units being coupled rotatably;
a carrying unit to rotate the housing chain, the carrying unit carrying the housing units to a carriage position; and
a transferring unit to be disposed facing a carriage destination of the recording mediums with the carrying unit existing therebetween to transfer the recording medium in the housing unit carried and positioned at the carriage position from the housing unit to the carriage destination or to transfer the recording medium in the carriage destination from the carriage destination to the housing unit,
wherein a pin provided for one housing unit of the adjacent housing units is engaged with a coupling hole, the coupling hole being provided for another housing unit of the adjacent housing units, the coupling hole being for insertion of the pin, and
the housing chain is formed by coupling the housing units with each other so that coupled sides of the housing units are arranged in an inside of a ring shape.

12. The library apparatus of claim 11, further comprising:

an identifying unit to identify and specify the recording mediums housed in the housing units; and a carriage control unit to control carriage by the carrying unit, wherein the carriage control unit controls to carry to the carriage position the housing unit housing the recording medium specified based on identification information of the recording mediums.

13. The library apparatus of claim 12, wherein the carriage control unit calculates a carriage amount of the housing unit housing the recording medium specified based on the identification information to the carriage position.

14. The library apparatus of claim 11, wherein the carrying unit includes a rotating mechanism that rotates the plurality of the housing units arranged in a ring shape.

15. The library apparatus of claim 11, wherein the transferring unit is disposed within a ring of the plurality of the housing units arranged in a ring shape to include a taking-out/putting-in mechanism that pulls out or pushes in the recording medium between the housing unit and the carriage destination.

* * * * *